(12) United States Patent
Ladd

(10) Patent No.: US 10,904,279 B1
(45) Date of Patent: Jan. 26, 2021

(54) POLICY GENERATION IN AIRBORNE SYSTEMS

(71) Applicant: Raytheon Company, Waltham, MA (US)

(72) Inventor: Gregory A. Ladd, Rowlett, TX (US)

(73) Assignee: Raytheon Company, Waltham, MA (US)

( * ) Notice: Subject to any disclaimer, the term of this patent is extended or adjusted under 35 U.S.C. 154(b) by 129 days.

(21) Appl. No.: 16/008,625

(22) Filed: Jun. 14, 2018

Related U.S. Application Data

(60) Provisional application No. 62/519,649, filed on Jun. 14, 2017.

(51) Int. Cl.
*H04L 29/06* (2006.01)

(52) U.S. Cl.
CPC ...... *H04L 63/1425* (2013.01); *H04L 63/1416* (2013.01); *H04L 63/1433* (2013.01); *H04L 63/205* (2013.01); *H04L 63/302* (2013.01)

(58) Field of Classification Search
CPC .......................... H04L 67/12; G06F 13/4282
See application file for complete search history.

(56) References Cited

U.S. PATENT DOCUMENTS

| 10,410,002 | B1 * | 9/2019 | Jenkins | ............... H04L 63/1416 |
| 2011/0283143 | A1 * | 11/2011 | Collins | .................. G06F 21/85 |
| | | | | 714/37 |

* cited by examiner

*Primary Examiner* — Jason K Gee

(57) ABSTRACT

A method can include detection of policy anomalies in packets on a 1553B bus of an airborne system. A computer network defense (CND) capability message is decoded and indicates an interface to monitor. The interface is a 1553B bus of the airborne system. A CND command message, associated with the CND capability message, is decoded and includes a policy set. Packets are received from the 1553B bus. The 1553B packets are analyzed based on the policy set to determine anomalies. Non-anomalous 1553B packets are allowed to reach destinations of the non-anomalous 1553B packets. Anomalous 1553B packets are discarded such that the anomalous 1553B packets do not reach respective destinations of the anomalous 1533B packets.

17 Claims, 27 Drawing Sheets

POLICY GENERATION IN AIRBORNE SYSTEMS

PRIORITY CLAIM

This application claims the benefit of priority to U.S. Provisional Patent Application Ser. No. 62/519,649, filed Jun. 14, 2017, and entitled "POLICY GENERATION IN AIRBORNE SYSTEMS". The above-identified provisional application is incorporated herein by reference in its entirety.

TECHNICAL FIELD

Embodiments discussed herein regard devices, systems, and methods for cyber anomaly detection.

BACKGROUND

Malware, short for malicious software, is one of a variety of techniques used to control or gain access to a device or application without administrator knowledge. Other adverse actions that fall within a cybersecurity domain include manual control of the device or application, e.g., direct injection, scrambling, intercepting, e.g., eavesdropping, spoofing, denial of service, or the like. Each of these types of adverse actions can be detrimental to operation of a device or an application.

Aircraft in the Department of Defense (DoD) inventory use control/data busses based on the MIL-STD-1553B (1553B) standard. These control/data busses control critical subsystems such as avionics, mission systems such as radars, and weapons management. This standard, developed over 40 years ago, is vulnerable to potential cyberattacks.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

Figure 1:
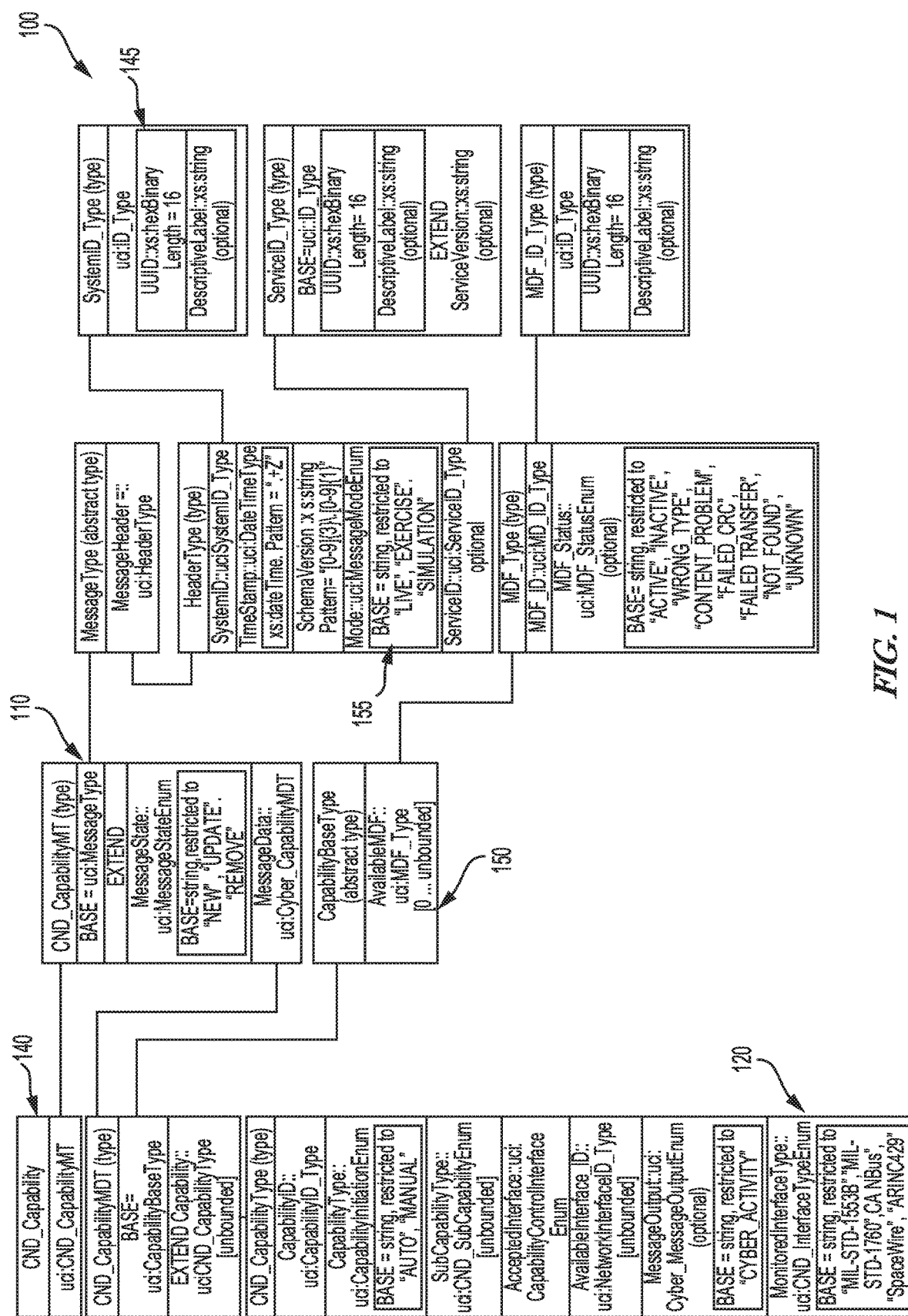
FIG. 1 illustrates, by way of example, an embodiment of respective portions of a capability schema.

The following detailed description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

DETAILED DESCRIPTION

Embodiments are directed to an Intrusion Detection System (IDS) for detecting attacks against the vulnerabilities of the 1553B bus. Embodiments focus on controlling the IDS through use of command and control (C2) constructs derived from the Open Mission System (OMS) standard. The C2 constructs enabling the IDS to be controlled in a manner similar to any other OMS compliant subsystem. Using the C2 constructs, the IDS may be controlled from an on-board mission computer, which allows the functioning of the IDS to be changed based on changing mission conditions. The IDS, therefore, provides a system to detect network intrusion of an aircraft network that uses a 1553B bus.

Prior work indicates an absence of specific designs within the OMS standard for setting up and controlling Computer Network Defense (CND)-specific functions focused on the network traffic between subsystems within the aircraft. Most efforts within the OMS community have focused on information assurance issues centered on processors and related information technology issues. Embodiments described provide a unique entry into the OMS domain. For example, embodiments incorporate specific identification and authorization (IA) functions such as authentication and authorization. In addition, embodiments provide anti-tamper provisions for address hardening providing further extensions to OMS-based systems.

Embodiments use OMS-based constructs for C2 to control IDS functionality in a standard mission environment. The OMS standard makes use of generic concepts of "Capability" and "Activity" to define (a) specific actions a system can perform and (b) specific instances where the subsystem is performing the given action. In this sense, a "capability" defines what a system can do while an "activity" is one particular instance where the subsystem is performing a particular configured action defined by a capability. The OMS standard defines the concept of Command and Command Status messages. Command messages are further broken down into two subtypes (a) for configuring a Capability and (b) for controlling the actions of an active Activity associated one of the Capability types. This message set, and the resulting states implied by the configuration and activation of specific Activities from a Capability, describe how a mission management system controls the functionality of a given subsystem.

Embodiments use a new set of CND-specific C2 schemas that use the same basic OMS mission constructs. These specific OMS schemas are shown in the FIGS. 1-11 and can be described as follows.

Figure 2:
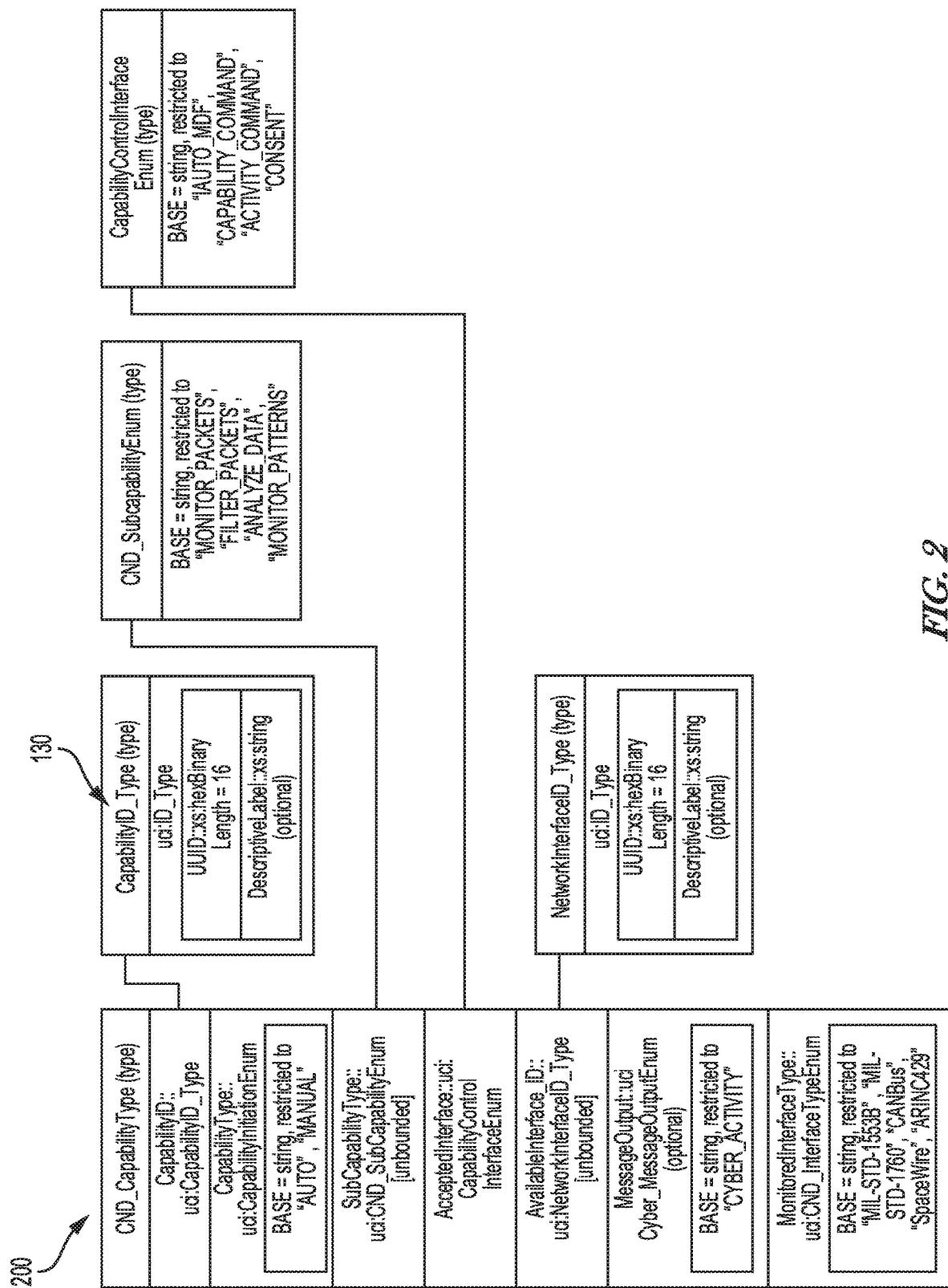
FIG. 2 illustrates, by way of example, an embodiment of respective portions of a capability schema.

FIG. 1 and FIG. 2 illustrate, by way of example, an embodiment of respective portions of a capability schema 100 and 200. The capability schema 100 represented in FIGS. 1 and 2 uses the standard Capability base subtype 140 defining the System ID 145, the corresponding Mission Data File (MDF) for the capability 150, the mission mode 155, etc. The extensions to the base type 140 provide the basic configuration for a CND-specific capability. The main functionality encoded in the extension links IDS functionality to a particular interface object 120 (e.g., the 1553B interface module), a specific type of functionality 130 (e.g., IDS or intrusion prevention system (IPS), an output file handle, and a link to a specific means for configuring the subsystem functionality (e.g., the MDF or a subsequent command message).

Figure 3:
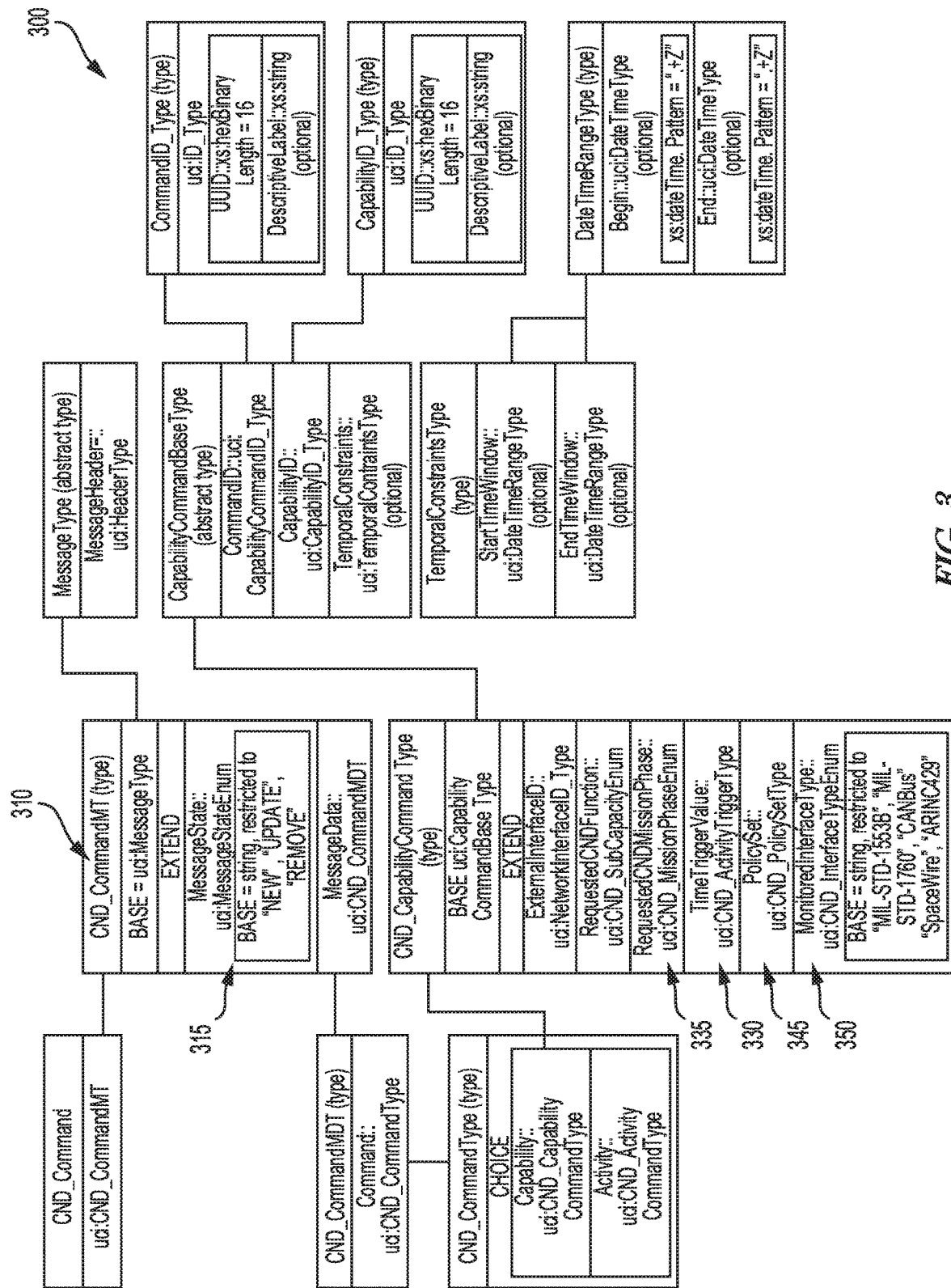
FIG. 3 illustrates, by way of example, an embodiment of respective portions of a command schema.
Figure 4:
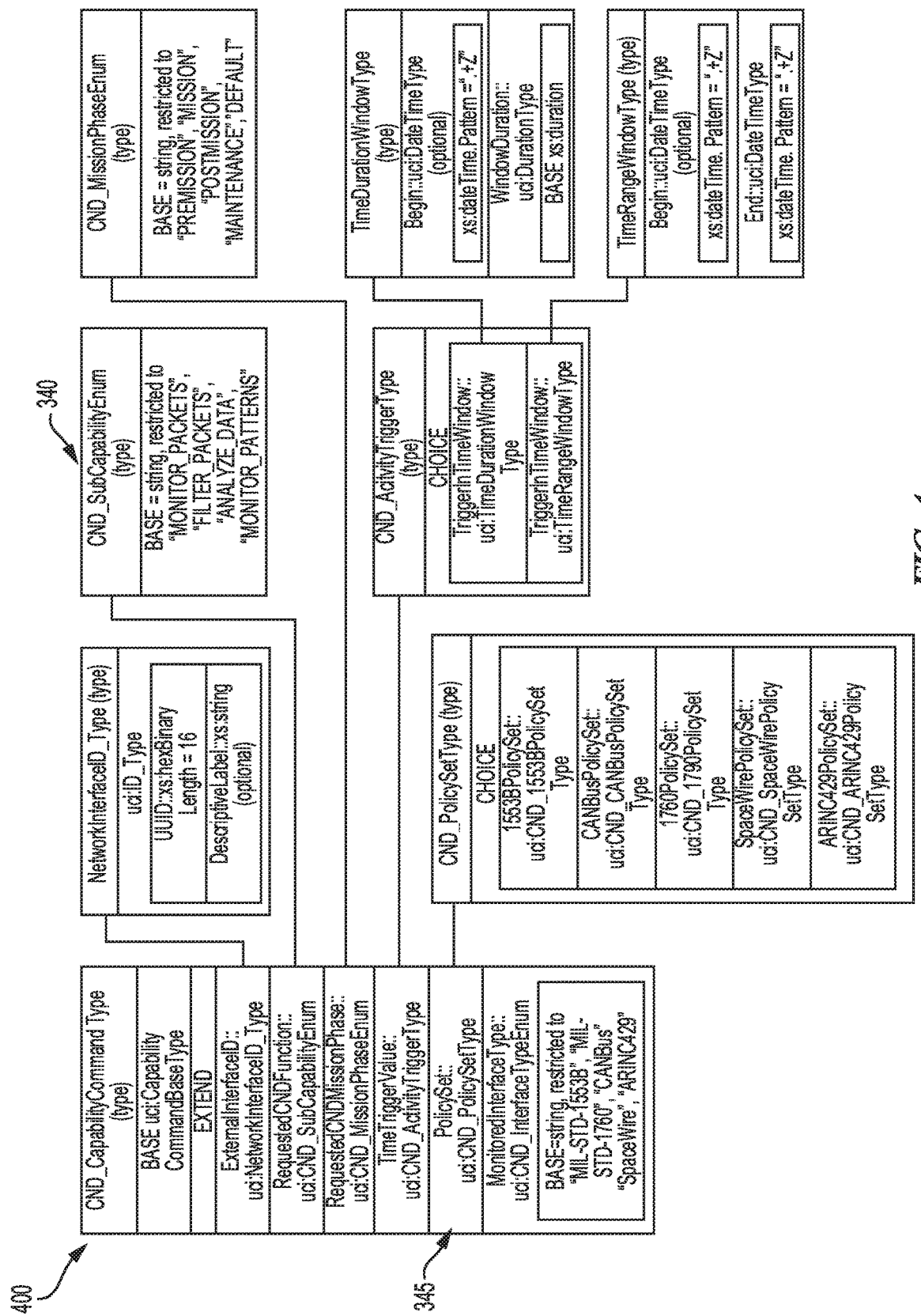
FIG. 4 illustrates, by way of example, an embodiment of respective portions of a command schema.
Figure 5:
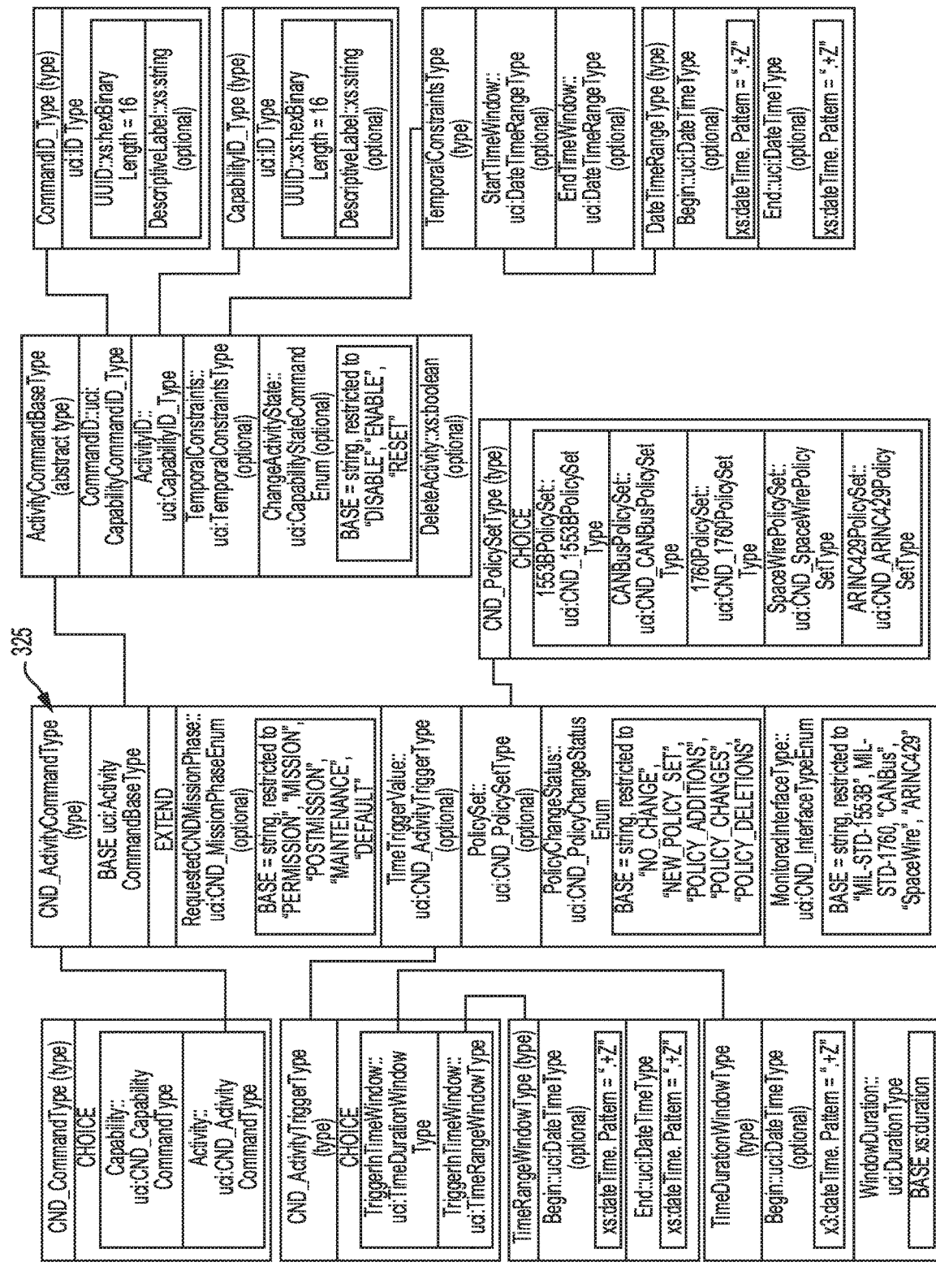
FIG. 5 illustrates, by way of example, an embodiment of respective portions of a command schema.

FIGS. 3, 4, and 5 illustrate, by way of example, an embodiment of respective portions of a command schema 300, 400, and 500. Command schema 310 also uses a standard OMS Command base subtype having the same basic data as the capability base type as well as a message state 315 defining whether the command is to initiate a new action or update/delete an existing action. The command message is further divided into two additional subtypes—one for configuring capabilities 320 (CND_CapabilityCommandType), the other for controlling activities 325 (CND_ActivityCommandType). For the CND system the schema specifically defines how the particular capability will operate by defining the times over which the capability will be active 330, the particular phase of the mission in which it is operating 335, and the type of action 340 (IDS—"monitor" vs IPS—"filter") to be performed as well as linking the capability to a specific policy set 345 defining types of behaviors to be filtered or blocked. The activity command schema 350 is similar but focused on enabling the mission manager to control the timing of the activity and to modify the policy schema based on real-time feedback.

Figure 6:
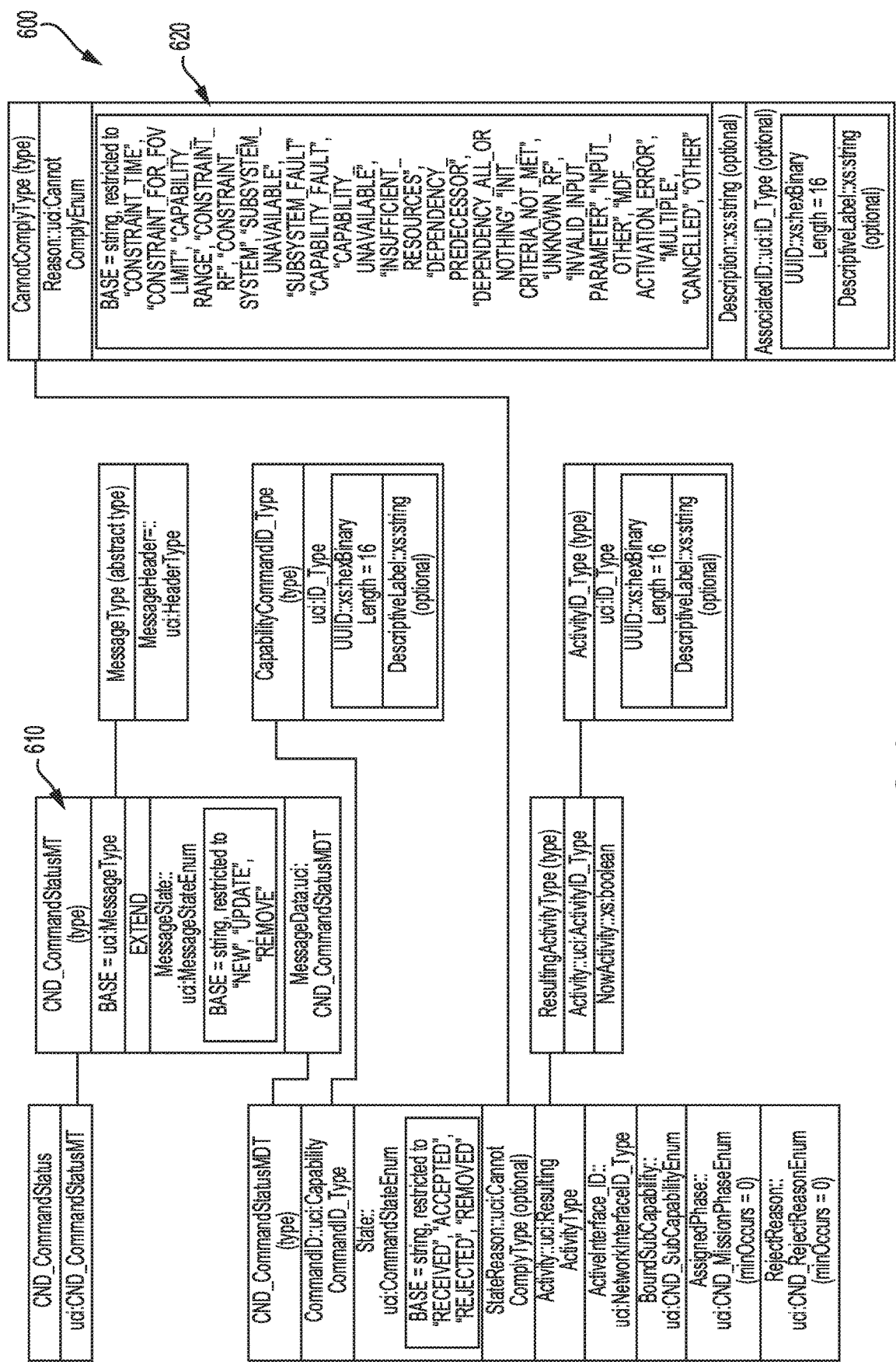
FIG. 6 illustrates, by way of example, an embodiment of respective portions of a command status schema.
Figure 7:
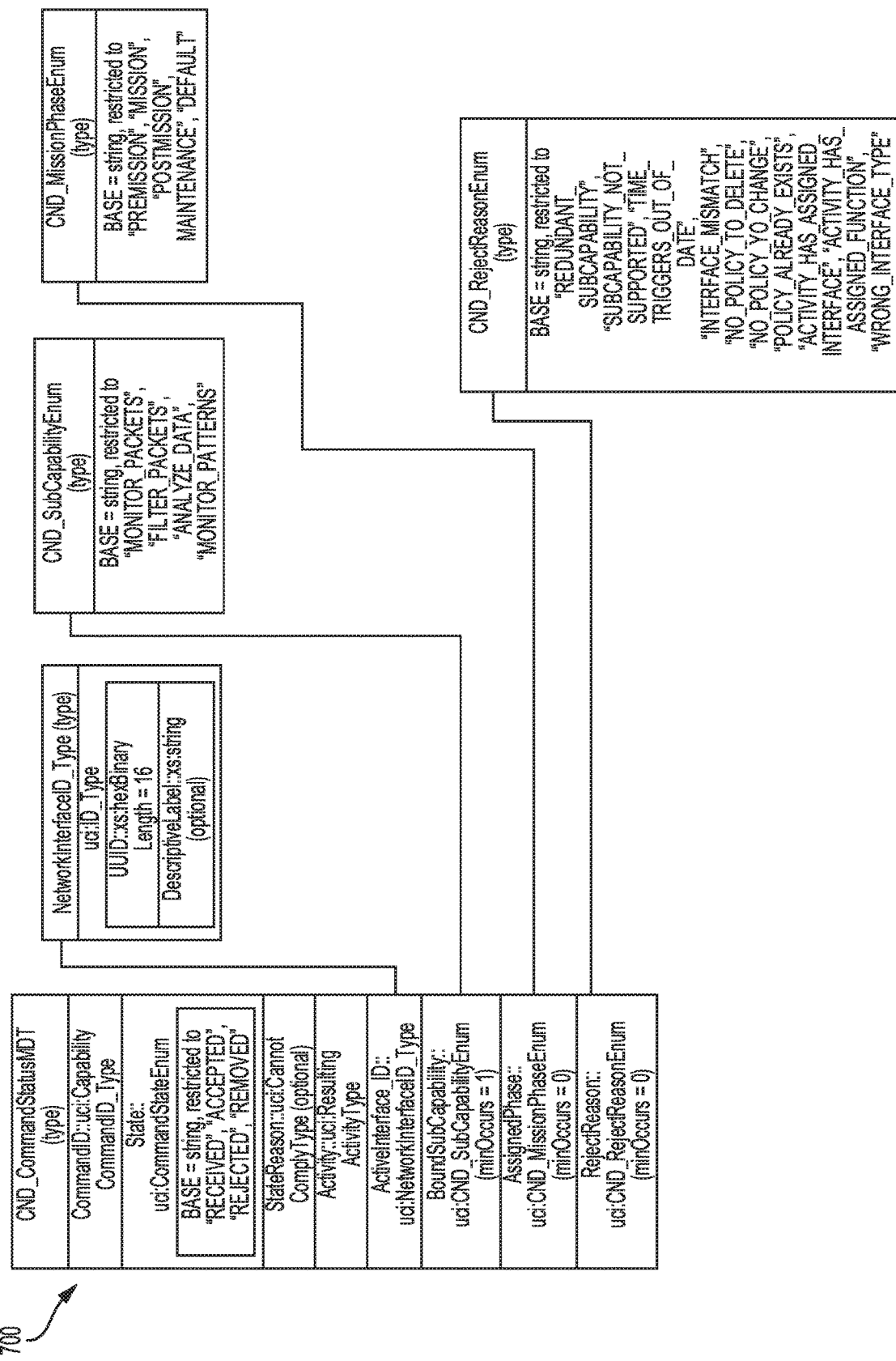
FIG. 7 illustrates, by way of example, an embodiment of respective portions of a command status schema.

FIGS. 6 and 7 illustrate, by way of example, an embodiment of respective portions of a command status schema 600 and 700. A command status schema enables 600 the subsystem to respond to commands from the mission manager. The major addition for supporting CND functions is a set of specific enumerated reasons identifying why the subsystem cannot comply with a specific command 620. These reasons include entries relating to the CND policy set (e.g., requests to change a policy not available within the set) and mismatches between a command and the type of interface being used.

Figure 8:
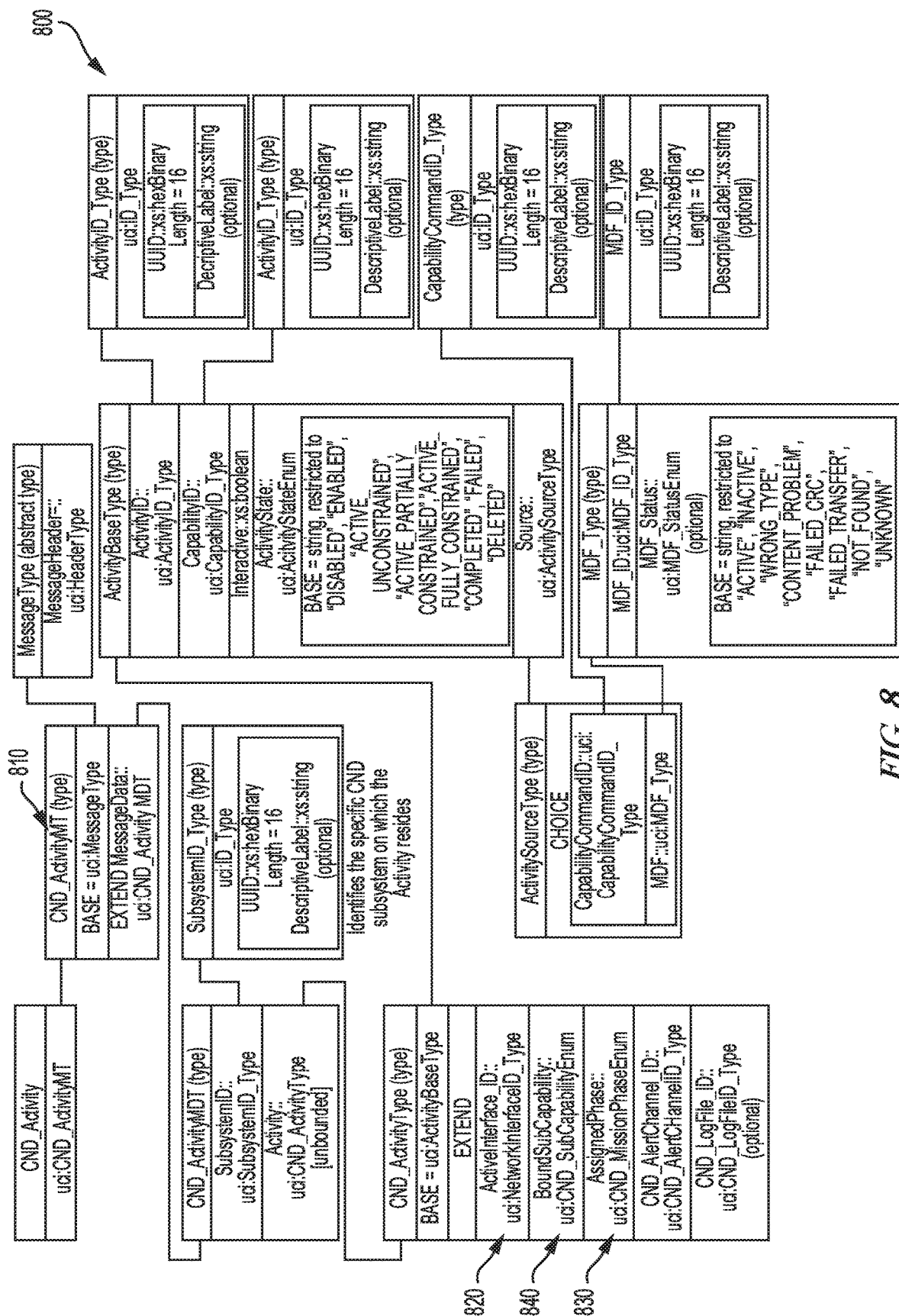
FIG. 8 illustrates, by way of example, an embodiment of respective portions of an activity schema.
Figure 9:
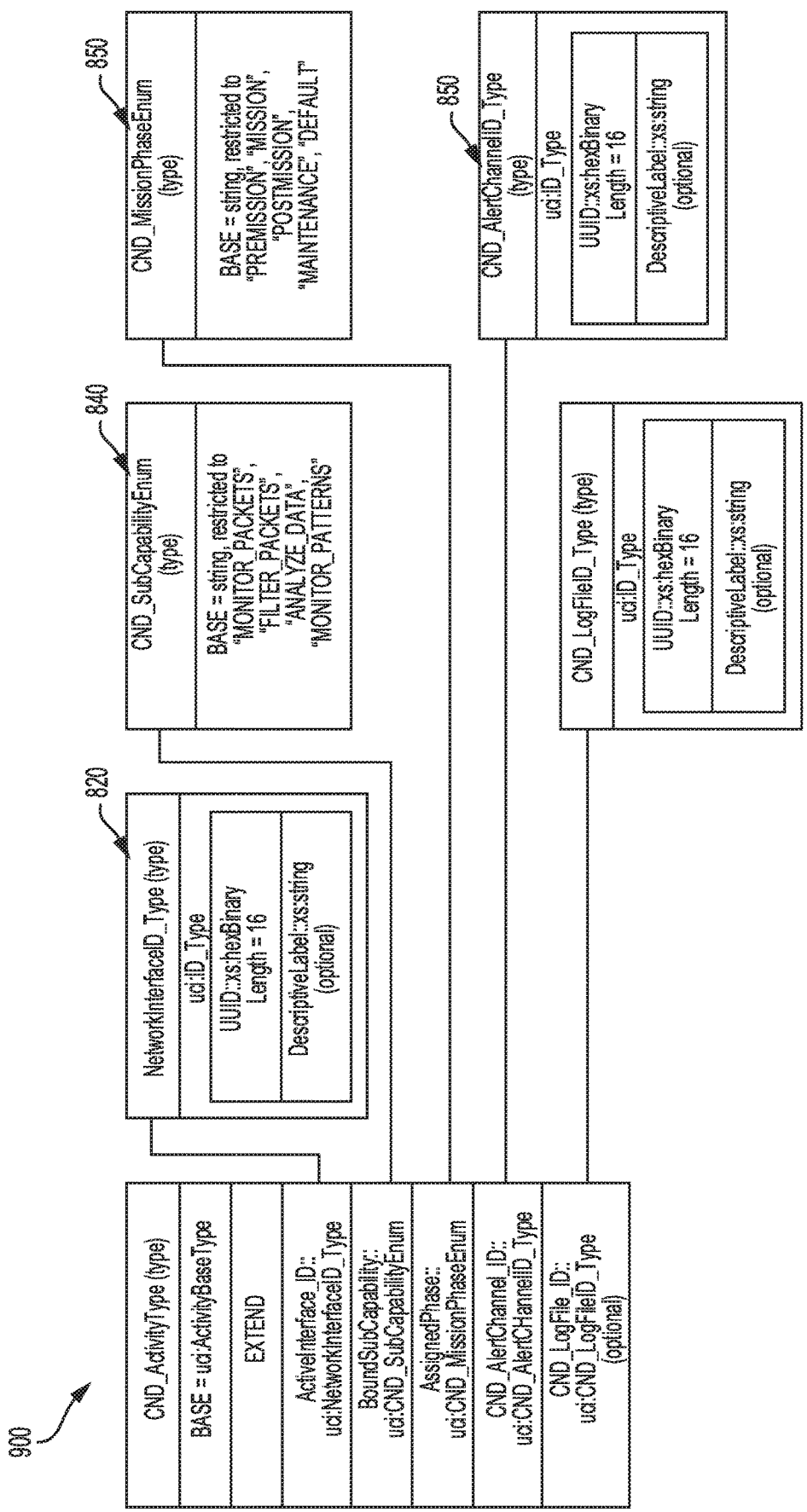
FIG. 9 illustrates, by way of example, an embodiment of respective portions of an activity schema.

FIGS. 8 and 9 illustrate, by way of example, an embodiment of respective portions of an activity schema 800 and 900. An activity schema 810 also incorporates the standard OMS activity base type and then adds specific CND content. This CND content is similar to that used for the Capability message—the content identifies which interface 820 is bound to the activity, the corresponding mission phase 830, and the type of CND action being performed 840. The activity schema 810 also identifies what channel is being used to process the alerts 850 generated by the CND function. In the illustrated embodiment, a separate communication channel is used for logging alerts. In other words, the alert data is not incorporated into the C2 data exchanges.

Figure 10:
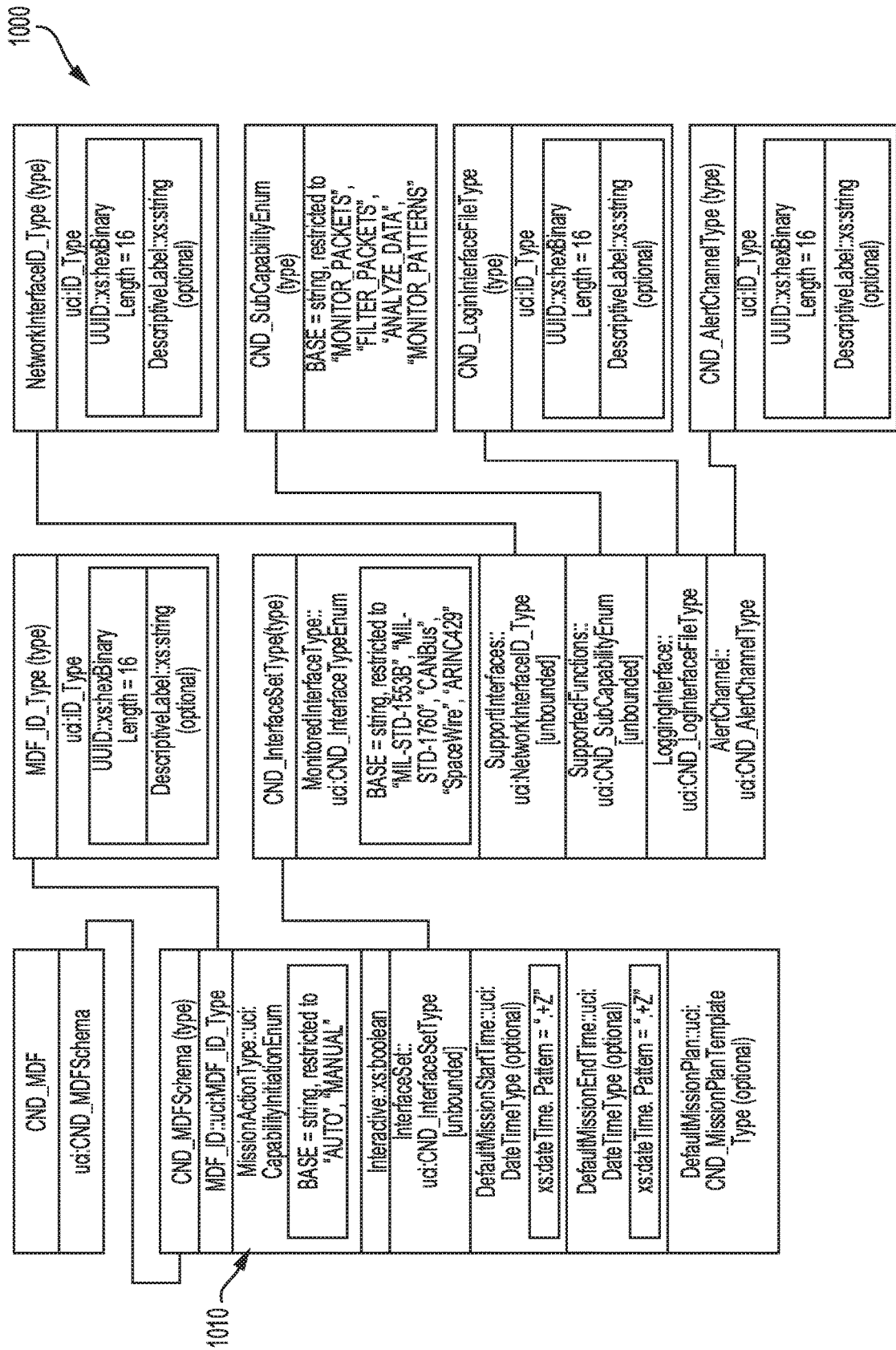
FIG. 10 illustrates, by way of example, an embodiment of elements of a mission data file (MDF) schema.
Figure 11:
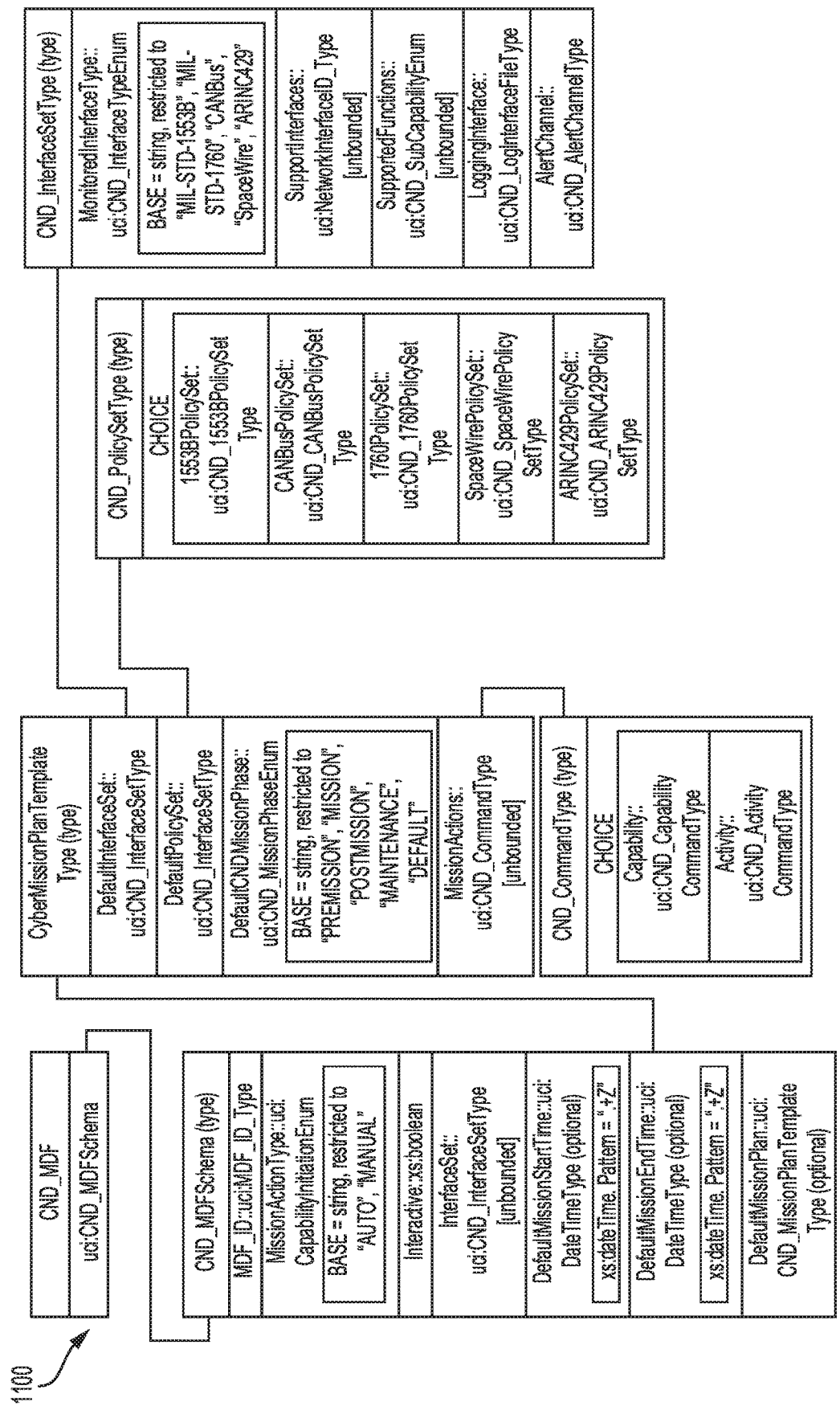
FIG. 11 illustrates, by way of example, an embodiment of elements of an MDF schema.

In addition to the previous messages there is also a Mission Data File (MDF) schema 1010. FIGS. 10 and 11 illustrate, by way of example, an embodiment of elements 1000 and 1100 of an MDF schema 1010. The MDF schema contains an agglomeration of the data contained in the four different message types described above and in FIGS. 1-9. This schema enables the system to run in an autonomous mode where no separate mission management function is available. The MDF contains all the upfront configuration data and a separate list of mission-specific actions (or "mission plan") mimicking the set of command messages normally sent by the mission manager.

In an embodiment, IDS/IPS behavior is codified into eXtensible Markup Language (XML)-based controls within the OMS standard. In other embodiments, the behavior may be codified using other techniques, such as a binary format, JavaScript Object Notation (JSON), etc. The additions to the schemas described above focus on defining IDS/IPS functionality to be configured and controlled during a mission. This may be accomplished through a set of CND parameters to be added to the OMS schema to configure and control the IDS and IPS functionality, which can include one or more of:

"NetworkInterfaceID_Type"—universally unique identifier (UUID) identifying the network interface module to be bound to the IDS/IPS function;

"CND_InterfaceTypeEnum"—enumerated interface type descriptor such as "MIL-STD-1553B" or "MIL-STD-1760" used to identify the particular type of interface to be protected;

"CND_SubcapabilityEnum"—enumerated descriptor defining the type of action to be taken by the system—current selections include transaction monitoring (IDS mode), transaction filtering (IPS mode), data analysis to find abnormalities in data streams for specific packets, and pattern analysis looking for patterns extending across multiple transactions;

"CND_MissionPhaseEnum"—enumerated descriptor identifying mission phase to support selection of specific policies based on mission phase such as permission, mission, postmission, or maintenance;

"CND_ActvityTriggerType"—defines the timing for activating the configured CND function; can either be defined as explicit start and stop times or a start time and duration;

"CND_PolicySetType"—describes a set of policies to be enacted for this particular CND mission function.

These policies define specific behaviors to be detected and specific thresholds to be achieved before generating an alert (IDS);

"CND_PolicyChangeStatusEnum"—enumerated descriptor defining specific actions to be taken to update a policy set; these include adding, changing, or modifying individual policies in a policy set or uploading a new policy set;

"CND_RejectReasonEnum"—enumerated descriptor defining why a particular command from the mission manager has been rejected; CND-specific reasons relate to policy change mismatches (e.g., the specific policy to be changed or deleted did not exist) and improperly coded interfaces (e.g., the interface type for the policy did not match the type of interface bound to the CND function);

"CND AlertChannelID_Type"—UUID defining the channel over which the alerts from the CND function will be sent; currently supports text alerts over TCP/IP; and/or "CND_LogFileID_Type"—UUID defining the log file for collecting any logging data from the CND function for postmission forensic analysis; currently supports standard syslog functions.

The standard OMS control flow may be used to set up and control CND functionality within a mission context. The OMS standard defines specific sets of interface patterns for command and control of subsystems. These patterns are inscribed in a set of state diagrams defining the subsystem state throughout the mission as the subsystem starts up, reads its MDF, and receives commands from the mission manager. Once triggered the subsystem enters an active mission state where the subsystem performs one or more activities corresponding to the capabilities defined for that subsystem.

In described CND embodiments, the same actions are performed, and the CND embodiments may follow the same basic state transitions as defined in the OMS specification. A set of scenario diagrams outlining the mission sequence required to set up and operate the CND subsystem are shown in FIGS. 12-24. These figures also include two OMS-compliant state diagrams showing normal operations as well as operations requiring changes to an active policy set.

Within a normal mission the following actions are taken with respect to the CND subsystem as illustrated in FIGS. 12-24. FIGS. 12-24 illustrate, by way of example, an embodiment of respective operations 1200, 1300, 1400, 1500, 1600, 1700, 1800, 1900, 2000, 2100, 2200, 2300, and 2400 that can occur at, around, or after power up. FIGS. 12-24 illustrate operations that may occur consecutively or in another order.

Figure 12:
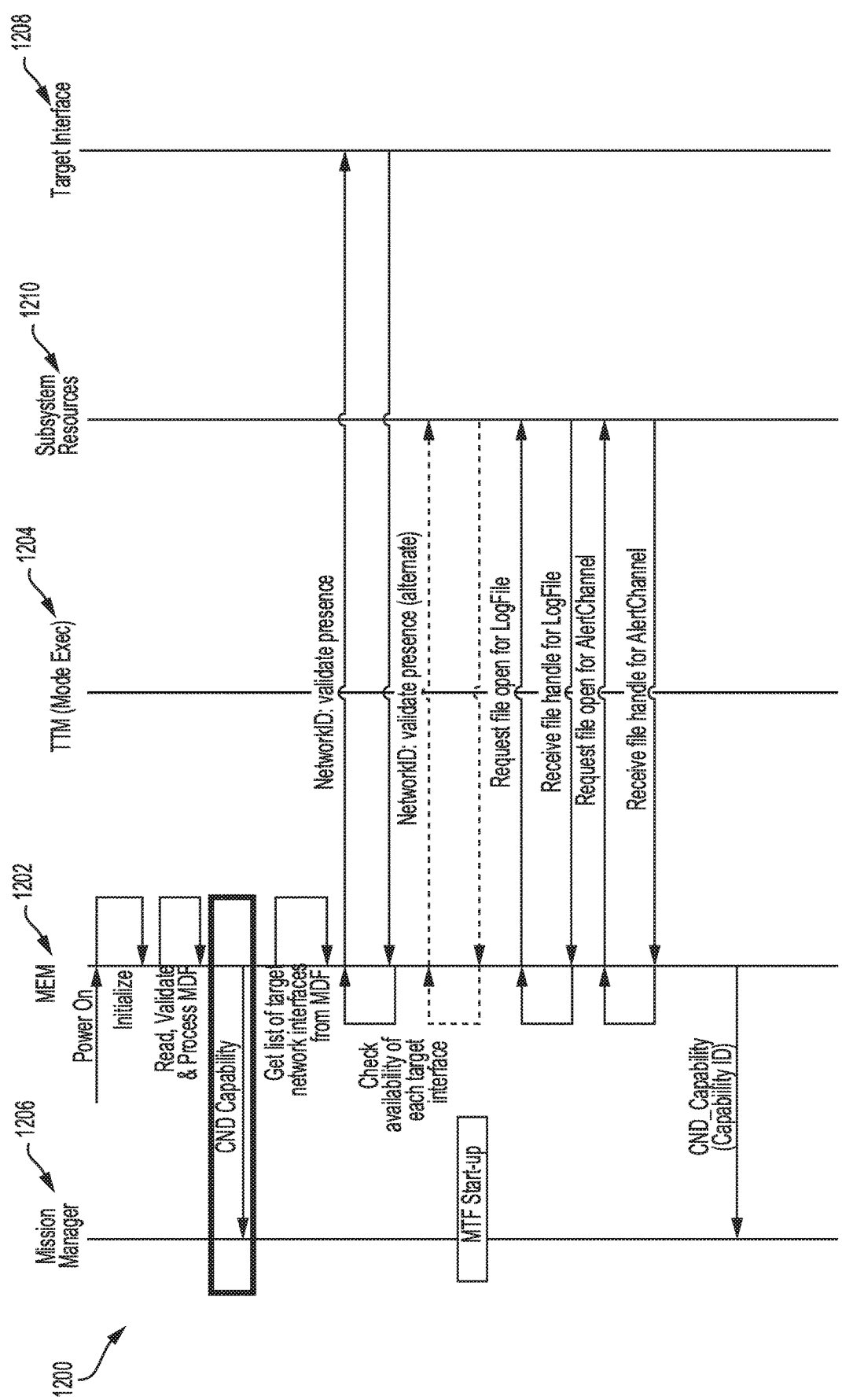
FIG. 12 illustrates, by way of example, of operations during a computer network defense (CND) system startup.

The following summary details some of the operations in the FIGS. 12-24. FIG. 12 illustrates, by way of example, of operations during a system startup. After power-up the CND capability which may include a Mission Execution Manager (MEM) and a Transaction Technique Manager (TTM). The MEM 1202 reads and validates a MDF and determines what network interfaces are going to be covered by the CND functionality from the MDF. If the MDF is not valid, then a capability message with the status of CONTENT PROBLEM may be sent, and the MDF may terminate after sending the capability message.

The MEM may then then set up these interfaces. In an embodiment, the MEM 1202 has a direction connection to the interfaces. The MEM 1202 may have request access to an interface through external communication services. Each interface may be defined by a network ID. The MEM 1202 may set up the log and alert channels as described in the MDF file. In response to setting up the channels, an open file handle may be returned. The open file handle may be saved for later user by the MEM 1202. The MDF file may contain information on the expected output channels for a mission.

The MEM 1202 may then send a CND_Capability message to a mission manager (MvM) 1206 indicating that the MEM 1202 can provide CND functionality for the given interface(s). In an example, there is one CND_Capability message for each interface type. For example, the capability message may indicate that the MEM 1202 is going to interface with the 1553B bus.

Figure 13:
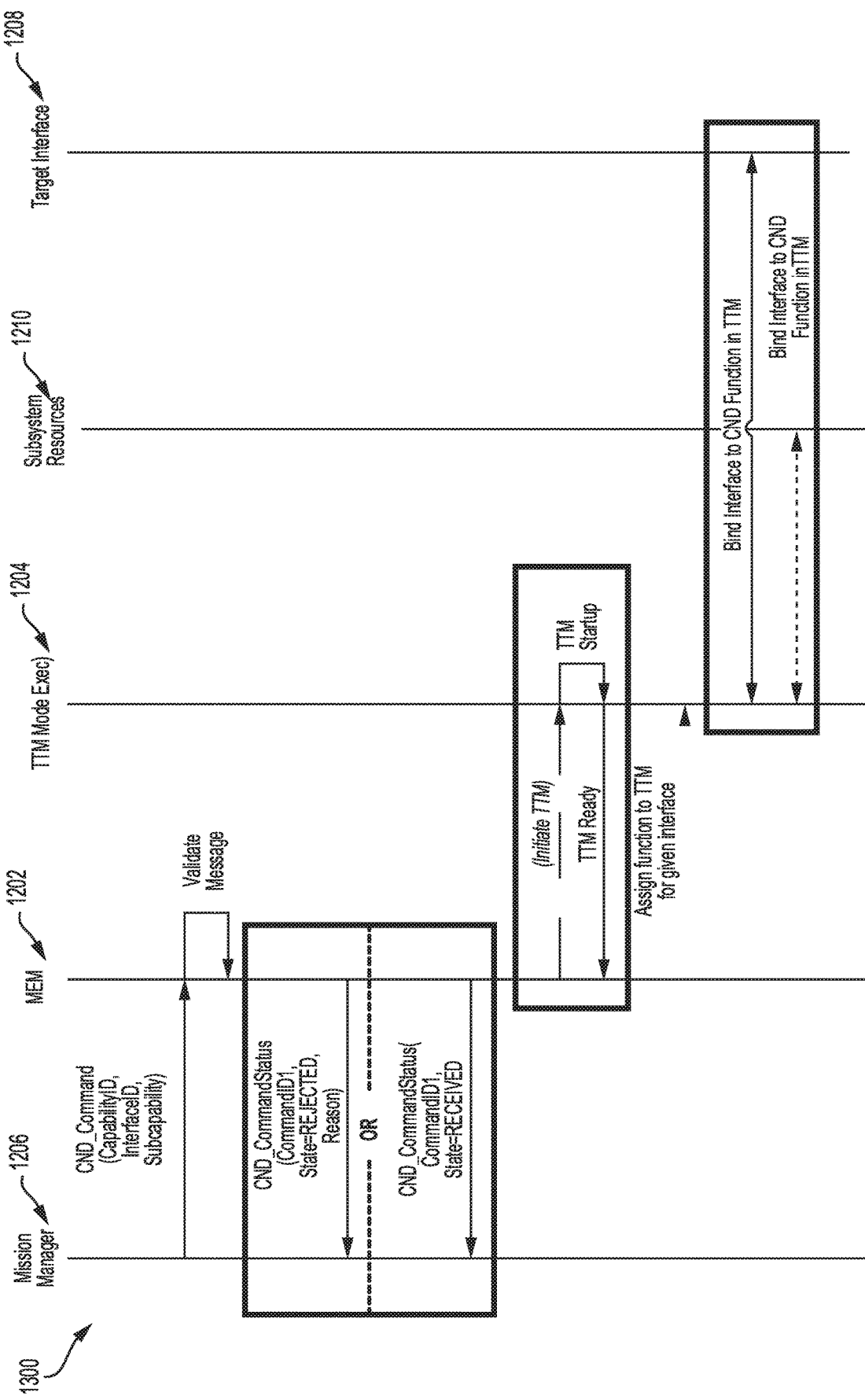
FIG. 13 illustrates, by way of example, of operations for enabling a mission task.

FIG. 13 illustrates, by way of example, of operations for enabling a mission task. The MM 1206 can send a Command message to configure a Capability. The command message may include time trigger value to indicate when the capability should be run. In addition, the command message may include a policy set to control the capability. The command message may be validated. The MEM 1202 may return a command status message indicating the command was rejected or received. A first command received by the MEM 1202 in a series of commands may be a capability command message that contains mission set-up information. In addition, the TTM 1204 may be initialized if the command is for a first function requested for an interface, such as a 1553B interface. The MEM 1202 may then assign the function to the TTM 1204. This assignment may also include the policy set. The TTM 1202 may bind to the interface if needed. The TTM 1204 may bind to the interface directly, indicated by the solid line between the TTM 1204 and a target interface 1208. The TTM 1204 may also use a driver interface through subsystem resources 1210, such as for a virtualized deployment. Using a driver interface is indicated using dotted lines between the TTM 1204 and the subsystem resources 1212.

Figure 14:
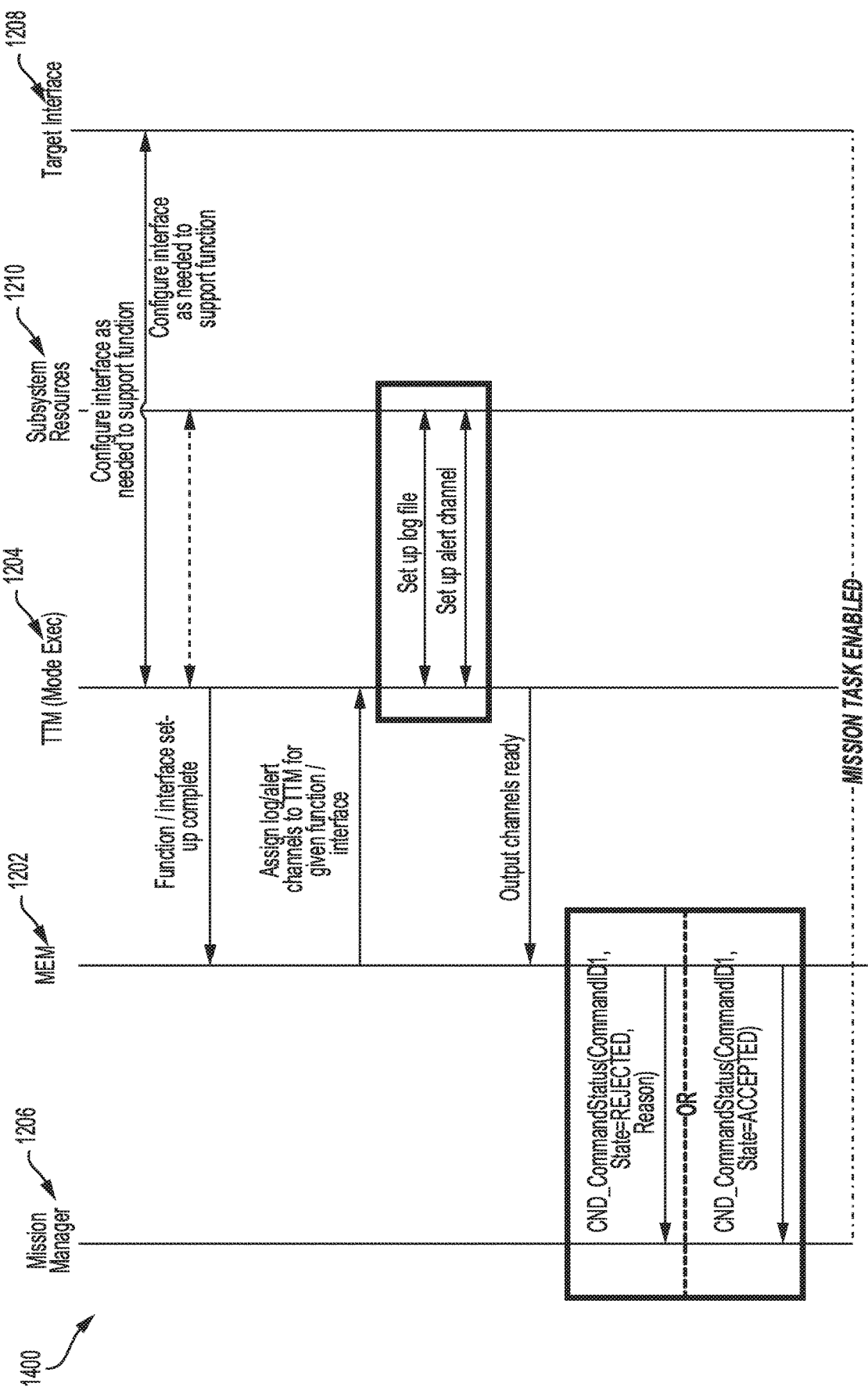
FIG. 14 illustrates, by way of example, of continued operations for enabling a mission task.

FIG. 14 illustrates, by way of example, of continued operations for enabling a mission task. Once the TTM 1204 configures the function, the MEM 1202 may assign log and alert channels to the TTM 1204. The TTM 1204 may then setup the log file and alert channel as needed. In an example, the open file handles received by the MEM 1202 earlier are passed and used by the TTM 1204. In an example, each interface is assigned one alert channel and one log file. These alert channels and log files may be reused across different functions. Once the MEM 1202 receives an output channel is read, the MEM 1202 may response with a command accepted command status message. Alternatively, if there were any issues initiating or configuring the subsystem a rejected command status may be sent. After sending this message, the mission task is enabled.

Figure 15:
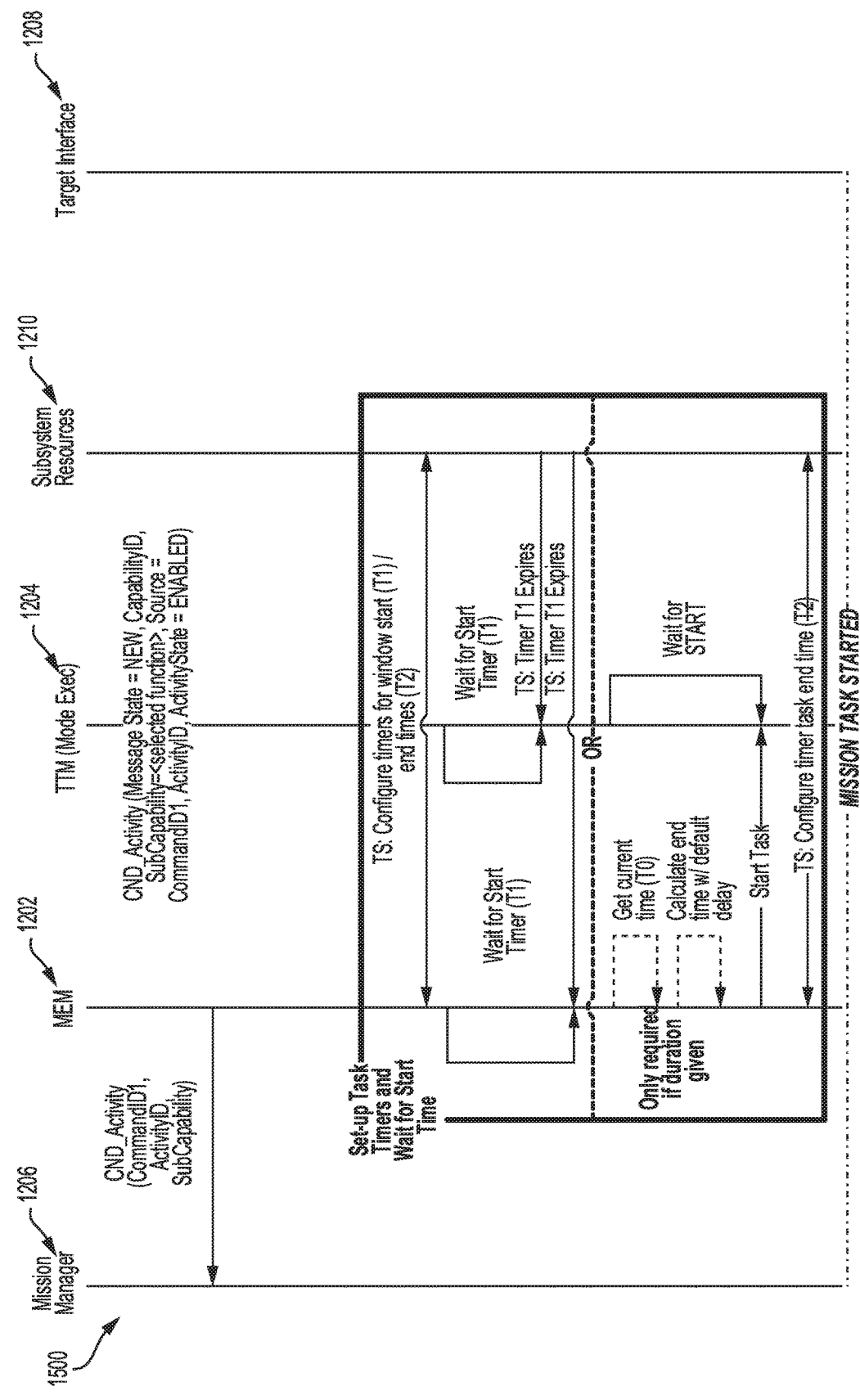
FIG. 15 illustrates, by way of example, of operations for starting a mission task.

FIG. 15 illustrates, by way of example, of operations for starting a mission task. If the command is accepted and enabled, the MEM may initialize the specific modules needed to perform the desired CND function and binds them to the appropriate interface(s). The MEM 1202 can return an Activity Command Status message to the MM 1206 indicating the CND mission is ready. The MEM may set up an activity trigger based on either start and stop times or a start tie with duration as defined by the MM 1206. In an example, there may not be a start time. In this example, the MEM 1202 may treat the start time as immediate. As shown in 1500, the MEM 1202 may setup a wait for start timer using the subsystem resources 1210. Once the timer expires, the CND activity may be started.

Figure 16:
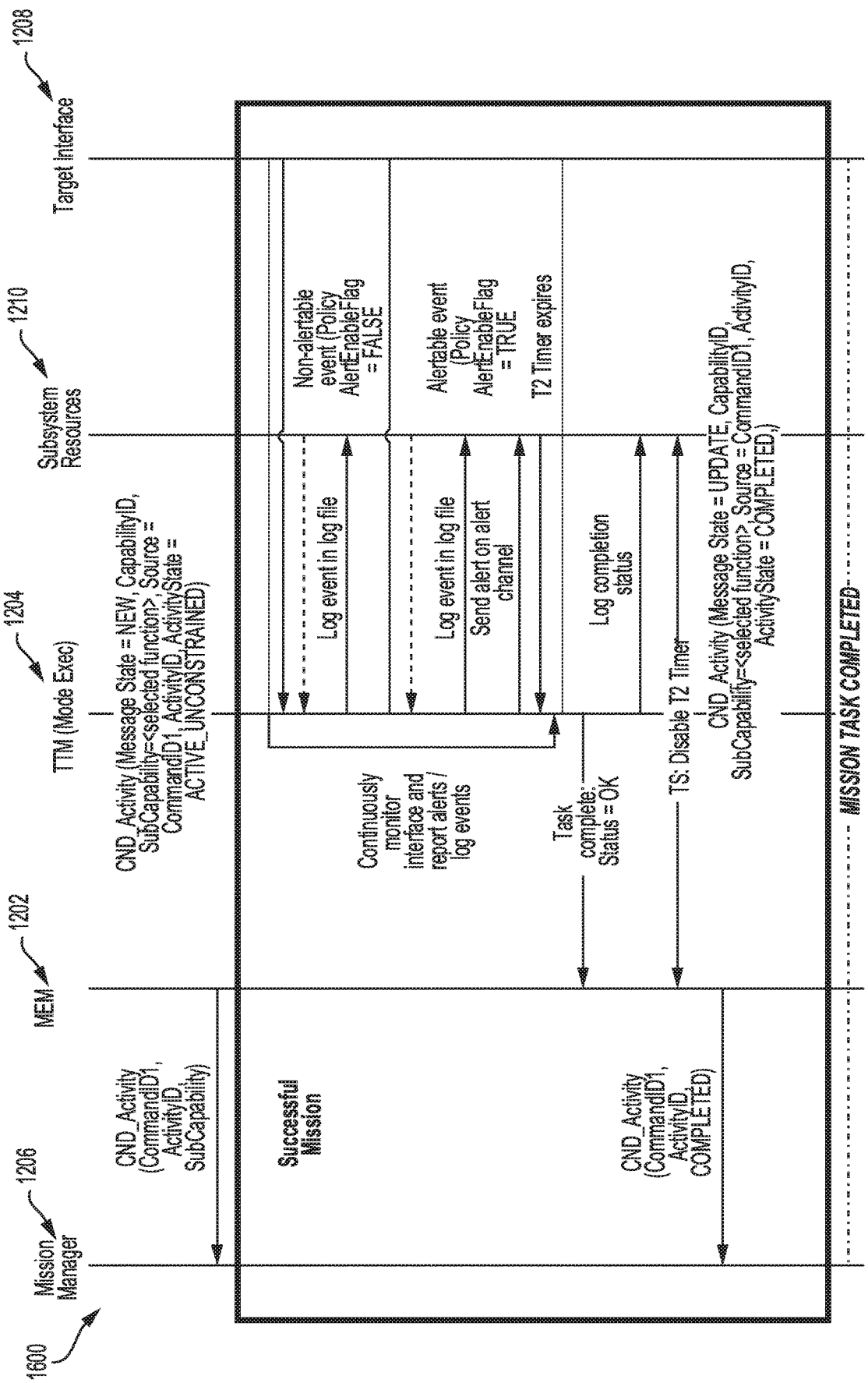
FIG. 16 illustrates, by way of example, of operations for completing a mission task.

FIG. 16 illustrates, by way of example, of operations for completing a mission task. After the time trigger is activated, the MEM 1202 starts the desired activity and sends an Activity CommandStatus message to the MM 1206 indicating the start of the CND activity (ActivityState=ACTIVE UNCONSTRAINED). The TTM 1204 may then perform the monitoring/alerting/filtering actions defined by the policy set and specified subcapability type. In an example, the TTM 1204 monitors data on the interface 1208, e.g., a 1553B bus. The data may be compared to the policy set to determine anomalies within the 1553B data. Any anomaly may be logged and an alert sent. All alerts and log data are routed to the specific alert and log channels. After the time window for the activity ends the subsystem shuts down the activity and sends an Activity CommandStatus message back to the MM 1206 indicating the activity is complete (ActivityState=COMPLETED).

Figure 17:
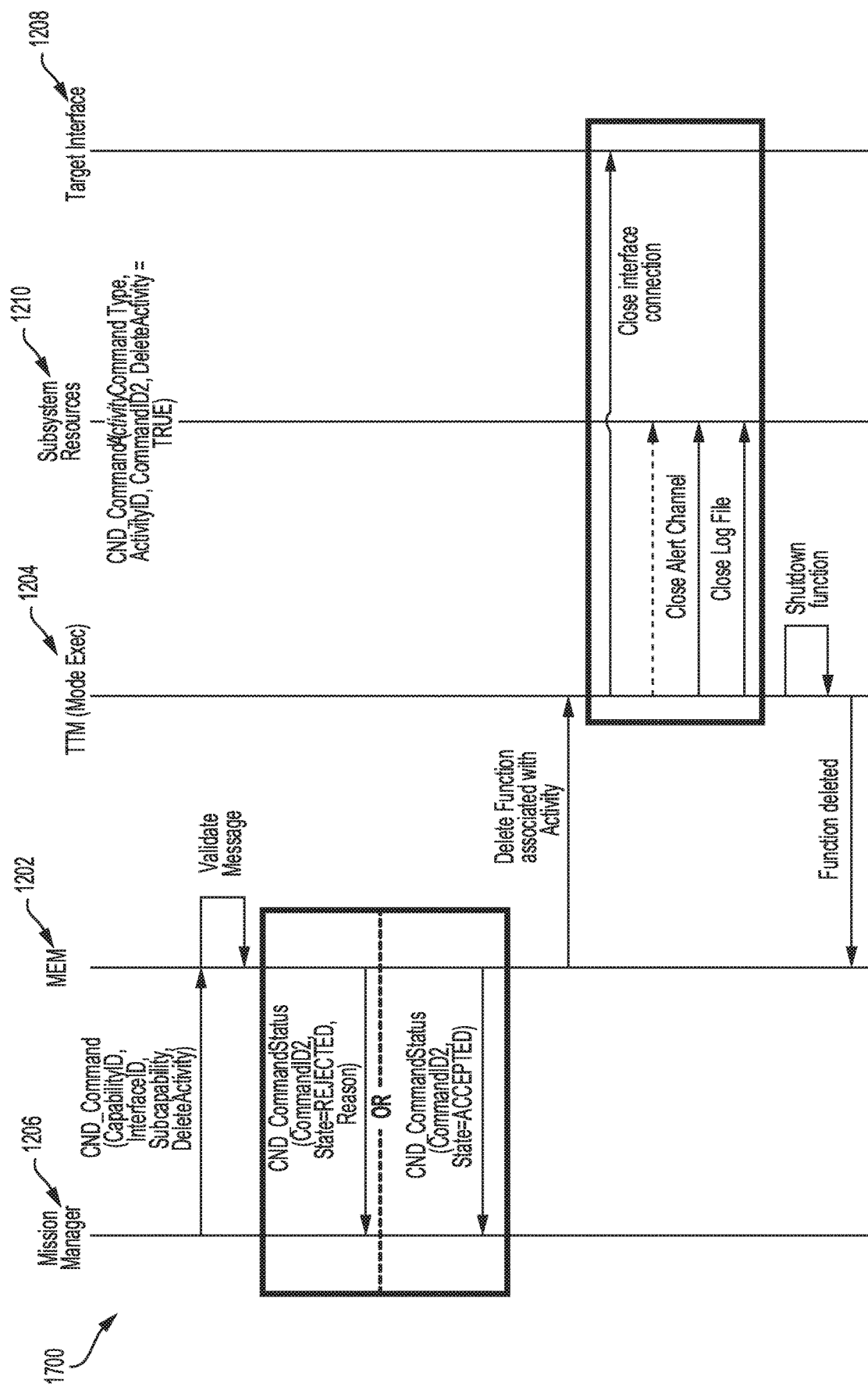
FIG. 17 illustrates, by way of example, of operations for deleting a function associated with an activity.

FIG. 17 illustrates, by way of example, of operations for deleting a function associated with an activity. The MM 1206 may send a command message to the MEM 1202 to terminate the completed activity. The MEM 1202 checks the validity of the message. If the message is not valid, a reject command status message is sent to the MM 1206. For example, the message may be corrupted or the provided activity ID may not be valid. Otherwise, an accepted command status message is sent to the MM 1206. Once a valid delete activity command message is received, the MEM 1202 may instruct the TTM 1204 to delete the function associated with an activity. The MEM 1204 can command the subsystem to take the actions necessary to delete the completed activity; the subsystem unbinds the interface(s) and deletes the threads related to the activity. The TTM 1204 may close the connection to the target interface 1208 and close the log file and alert channel. The connections to the interface 1208 and subsystems 1210 may be closed if there are no other activities assigned to the interrace. TTM 1204 may provide an indication that the function has been deleted to the MEM 1202.

Figure 18:
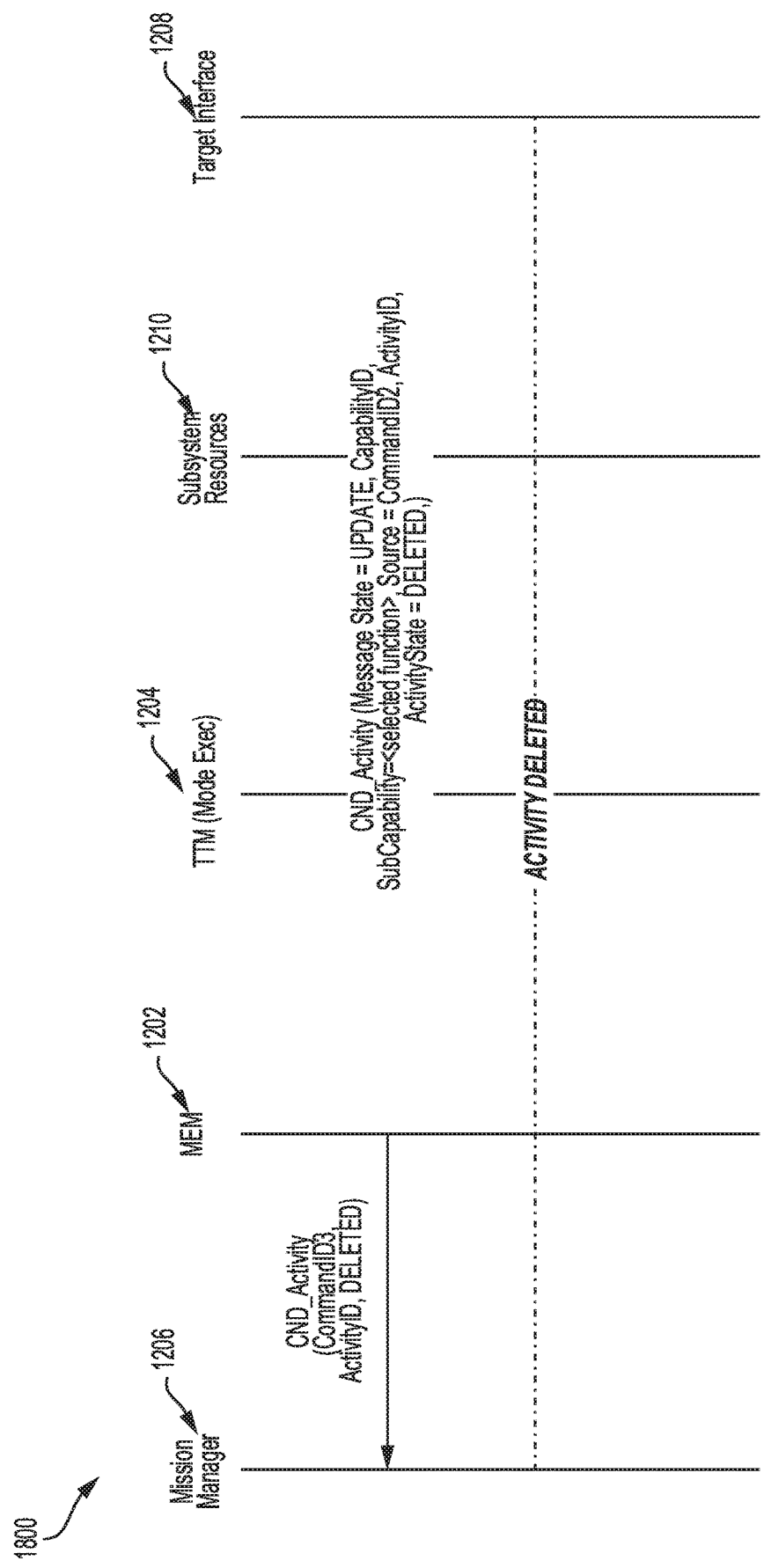
FIG. 18 illustrates, by way of example, of operations for deleting an activity.

FIG. 18 illustrates, by way of example, of operations for deleting an activity. The MEM 1202 can send an Activity CommandStatus message back to MM 1206 indicating that the activity has been deleted (ActivityState=DELETED).

Figure 19:
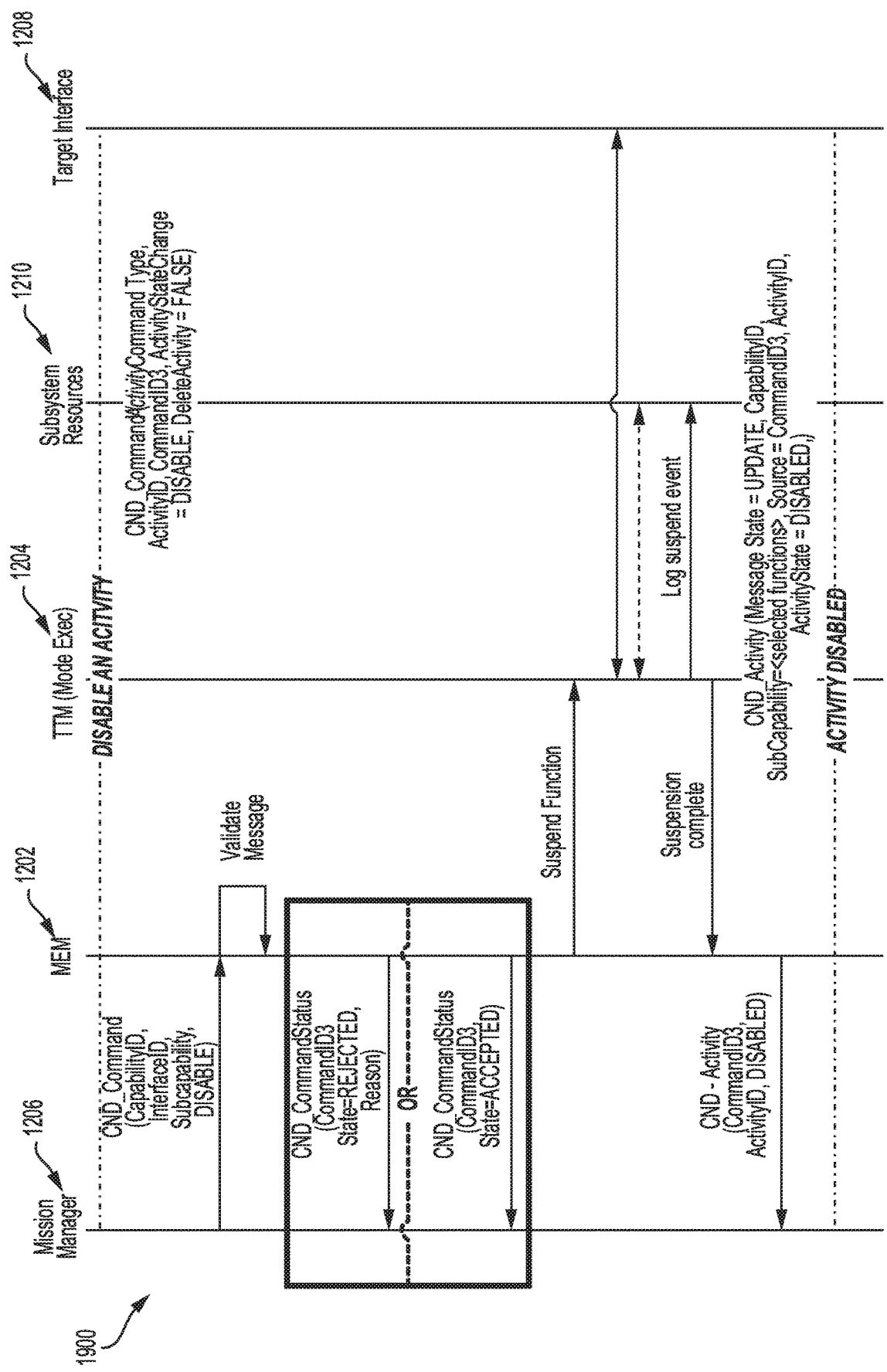
FIG. 19 illustrates, by way of example, of operations for disabling an activity.

FIG. 19 illustrates, by way of example, of operations for disabling an activity. The MM 1206 may send a CND command message the MEM 1202 to disable operations. The MEM 1202 may validate the message and respond to the MM 1206 appropriately. The MEM 1202 may instruct the TTM 1204 to suspend function. The TTM 1204 may suspend logging and alert activities, but without closing these resources. The TTM 1204 sends a suspension complete message to the MEM 1202. The MEM 1202 may then alert the MM 1206 that the activity has been disabled by sending a CND activity message. The MM 1206 may then reset the MEM 1202 as needed at a later time.

Figure 20:
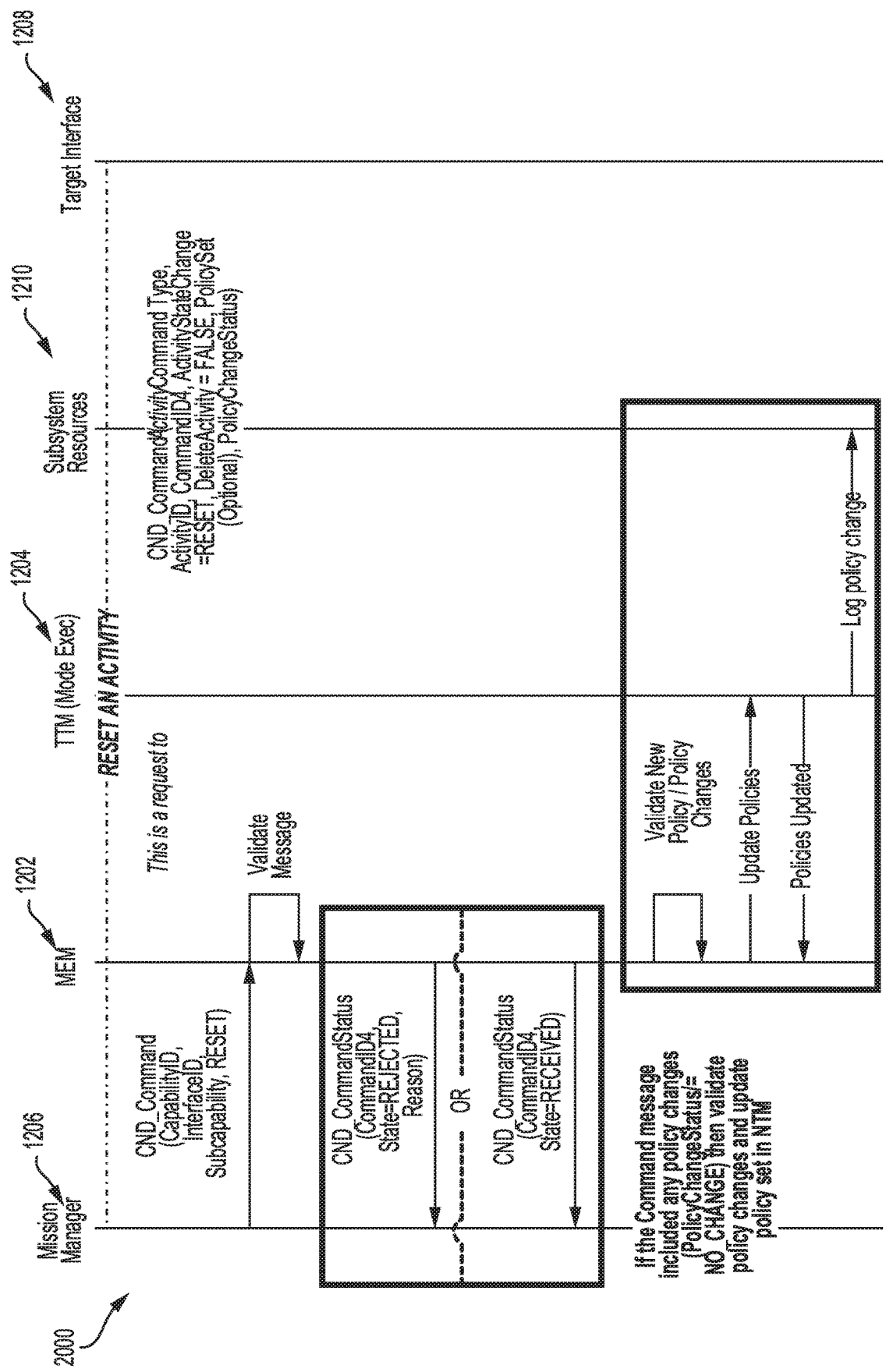
FIG. 20 illustrates, by way of example, of operations for resetting an activity.

FIG. 20 illustrates, by way of example, of operations for resetting an activity. The MM 1206 may send a CND command message the MEM 1202 to reset operations. The MEM 1202 may validate the message and respond to the MM 1206 appropriately. The reset command message may include new or updated policies for the MEM 1202. This may be indicated by setting the PolicyChangeStatus appropriately, e.g., some value other than no change. In addition, other change may have occurred within the entire system or mission. For example, the mission phase may have changed since the MEM 1202 was suspended.

For any new or updated policies, the MEM 1202 may validate the new policies and the updated policies. If there are issues with any of the policies, the MEM 1202 may reject the reset command. Once the policies have been verified, the policies may be sent to the TTM 1204. The TTM 1204 may log the policy change and provide an updated status to the MEM 1202.

Figure 21:
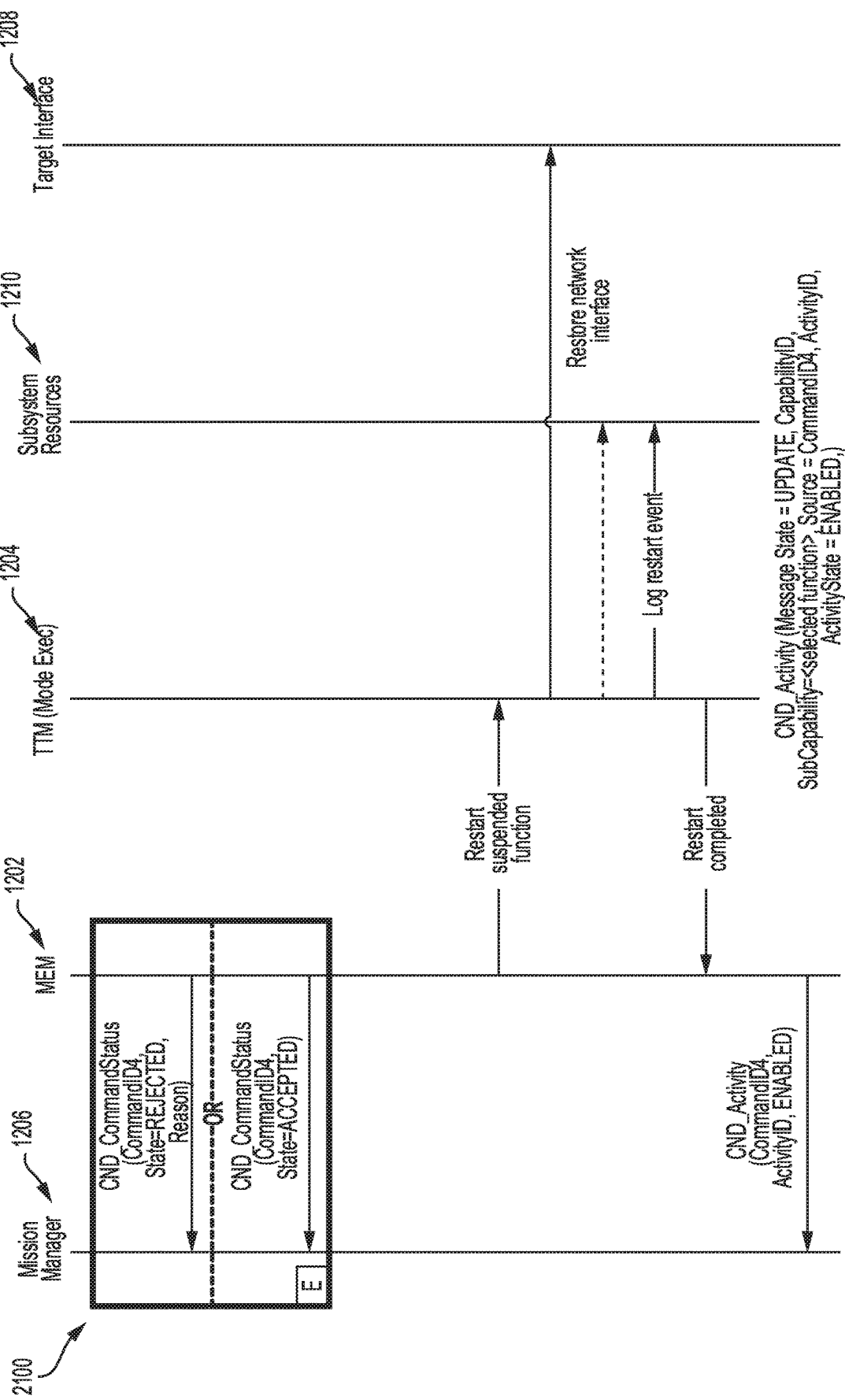
FIG. 21 illustrates, by way of example, of operations for restarting CND operations.

FIG. 21 illustrates, by way of example, of operations for restarting CND operations. After the policies are updated as needed, the MEM 1202 may send the TTM 1204 a restart function. The TTM 1204 may restore access to the target interface 1208. In addition, the TTM 1204 may restart logging and alerting using the subsystem resources 1210. The TTM 1204 can indicate the restart is complete to the MEM 1202. The MEM 1202 may then updated the MM 1206 by sending a CND activity message indicating the CND activity is enabled. When the CND activity is reset, there may be a new set of time triggers in the activity command.

Figure 22:
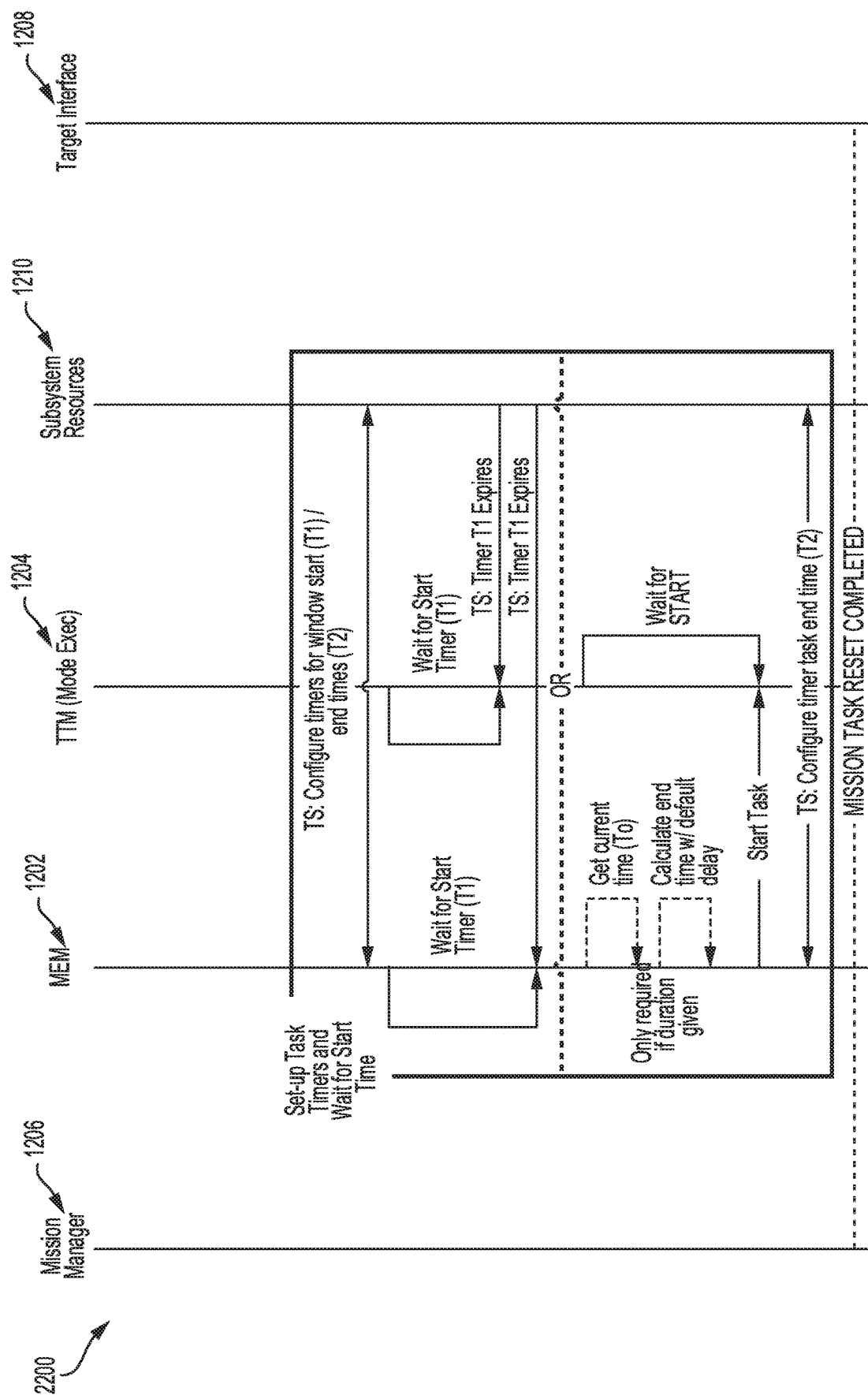
FIG. 22 illustrates, by way of example, of operations for restarting timers.

FIG. 22 illustrates, by way of example, of operations for restarting timers. The timers are setup after the activity is enabled. In an example, the MEM 1202 may setup the timers after sending the CND activity enabled message. In another example, the MM 1206 may wait until a later time to provide the timers to the MEM 1202. This may be done by sending a second activity command message with the new timer values. In this example, the MEM 1202 may set in the enabled mode until the timers are updated. The MEM 1202 updates the timers in a similar way as to normal start-up operations described in FIG. 15.

Figure 23:
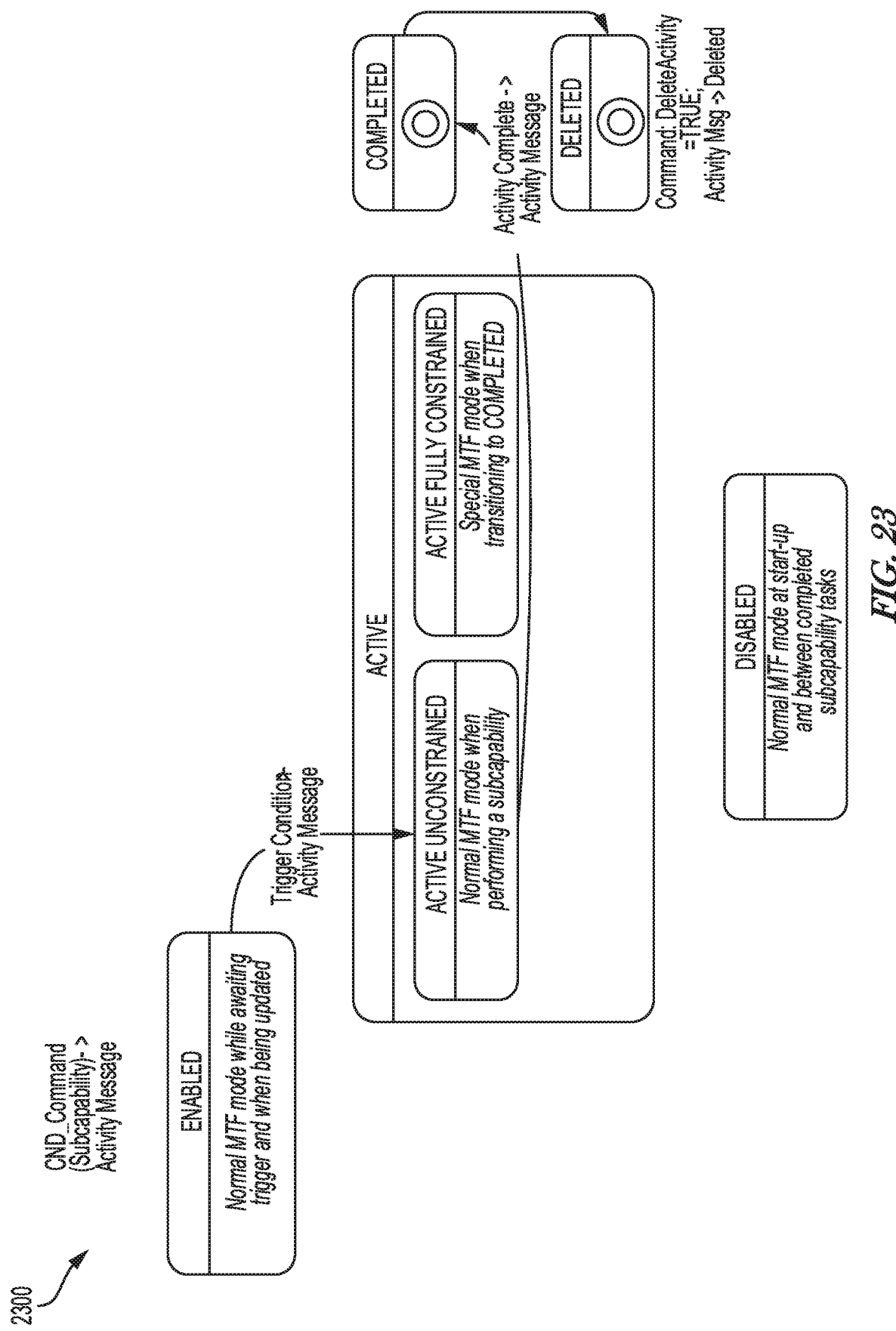
FIG. 23 illustrates, by way of example, a state diagram for normal operations of the MEM.

FIG. 23 illustrates, by way of example, a state diagram 2300 for normal operations of the MEM. After the CND subsystem is started, the subsystem enters a default available state. In this state, the CND, e.g., the MEM 1202, waits for a CND_command message. When this message is received, the CND transitions to an enabled state. The command message may include a trigger time to start the CND operations. When the trigger time occurs, the CND transitions to the active state. In another example, the command message does not include a start time, and the CND transitions to the active state. In the active state, the CND performs its defined subcapability. For example, the CND may monitor packets on a 1553B bus and look for anomalies in the packet data. Anomalies may be found based on the policy set used by the CND. The CND may also have a stop time, at which point the CND sends an activity complete message and transitions to the completed state. If the CND receives a delete command, the CND takes the necessary actions to delete the resources used by the CND.

Figure 24:
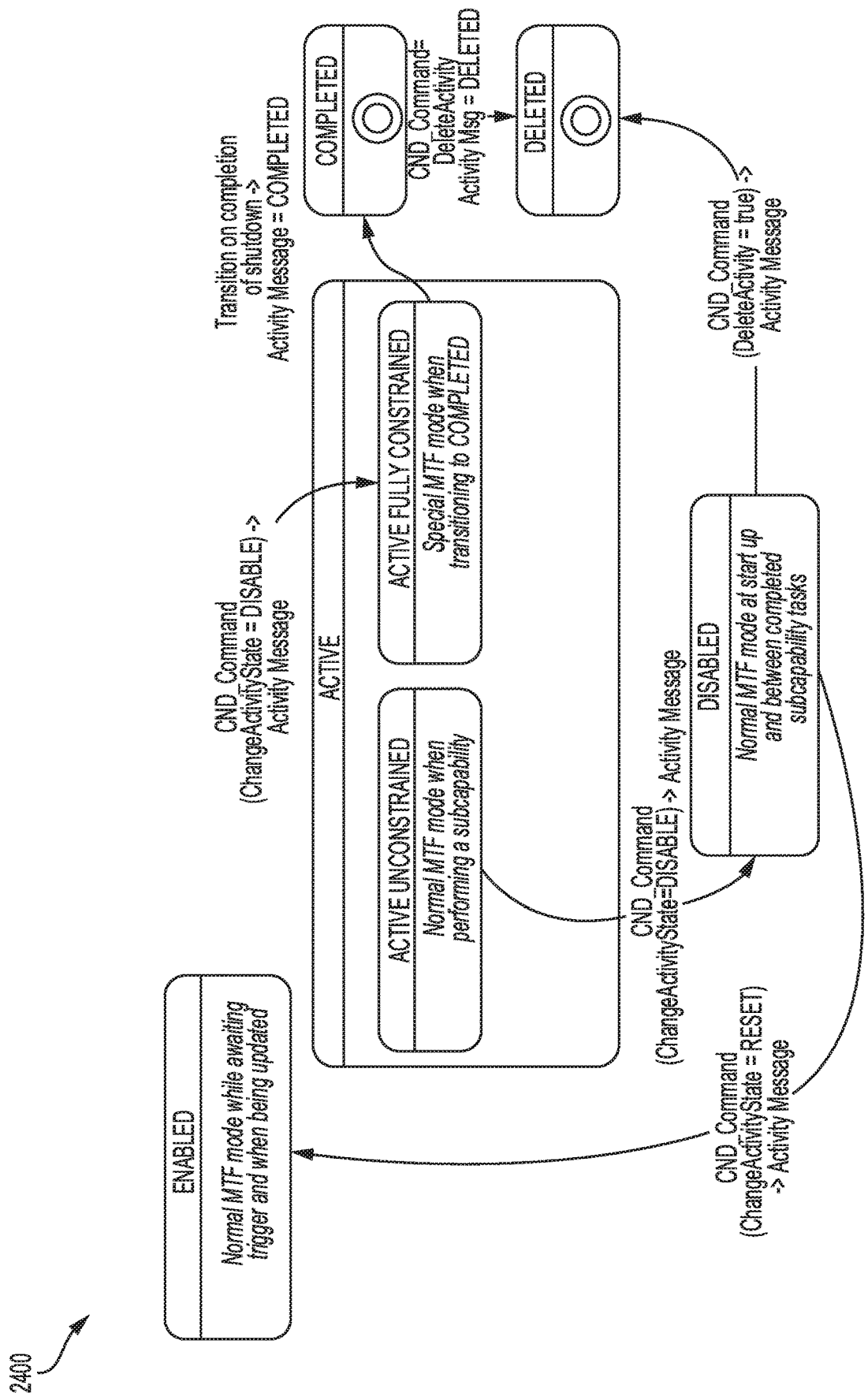
FIG. 24 illustrates, by way of example, a state diagram for delete operations of the MEM.

FIG. 24 illustrates, by way of example, a state diagram 2400 for delete operations of the MEM. While the CND is in the active state, the CND may receive a command message to disable the CND. When this message is received, the CND transitions to a disabled state. The disable command may be treated as an abort command. In the disabled state, the CND may transition to the enabled or deleted state depending on the message received from the MM. The command message may include a reset activity, which transitions the CND to the enabled state. In the enabled state, a disable command message is treated as an abort request. The MEM transitions from the enabled state to the active fully constrained state. In the active fully constrained state, the MEM transitions to the completed state.

In the disabled state, the MEM may also receive a delete activity command message. When this message is received, the MEM releases all resources used by the MEM.

In various examples, OMS-based constructs for C2 may be used to control IDS functionality in a standard mission environment. Embodiments define CND-specific Capability, Command, Command Status, and Activity extensions for controlling an IDS for an interface, e.g., a 1553B system, using the OMS specification for airborne systems. In an example, IDS/IPS behavior may be codified into XML-based controls within the OMS standard. Embodiments define specific data types for controlling the mission (by mission phase, interface type, and/or time windows) and defining the policy to be used by the IDS. Embodiments, additionally or alternatively define separate channels for alerting and data logging. Embodiments, additionally or alternatively, update command response criteria to allow the IDS to reject commands due to inconsistencies in the interface type and policy identifiers. The standard OMS control flow can be used to set up and control CND functionality within a mission context. Embodiments define a full set of scenario diagrams for setting up and executing an IDS mission as well as a disable/reset cycle to support policy modification in a live Activity. Embodiments can include an Activity state followed the prescribed state flows from the OMS specification.

Other embodiments describe an approach to defining and enumerating a set of anomalous behaviors for any given transaction on airborne platforms, such as on a 1553B bus. The anomalous behaviors may be described in the form of an eXtensible markup language (XML) schema.

There is a definable set of anomalous behaviors potentially occurring within individual MIL-STD-1553B bus transfers that could indicate system compromise. Typical aircraft networks, conforming to the MIL-STD-1553B, assume that all the subsystems attached to the bus perform according to the requirements laid out in the specification. Although these systems are formally validated within various test and evaluation environments outside of a mission context, no similar monitoring is required once the subsystem is installed in the platform. This implies that an attacker could use illegal or invalid commands or data on the bus to perform a number of actions, to include exploiting a subsystem or communicating covertly with other software agents. Presuming that the attacker desires to perform these actions without creating undue side effects, information content within specific message types could be changed or actual bus transfer mechanics could be modified to violate the specification without causing major disruptions to normal operations—or at least limit the scope of any of disruptions.

Based on the nature of bus transfers defined by the MIL-STD-1553B standard, it is possible to identify potential areas where an attacker might accomplish this goal. Unlike Ethernet, the 1553B bus is a mediated bus. A 1533B bus includes is a dedicated subsystem called a Bus Controller (BC) that is responsible for setting up and enacting all data transfers on the bus. A single data transfer includes the issuance of a bus command by the BC followed by either a transfer of data from the BC to one remote terminal (RT), the transfer of data from one of the RTs to the BC, or the transfer of data between two RTs depending on the control information in the command word. The RT(s) also transmit a status word at some point in the data transfer process. The exact timing of the status word transmission is defined based on the type of transfer. The BC can also transmit just a command word to one (or all) RT(s). So, each transfer involves at least one command word, either one or multiple data status words, and potentially a transfer of one or more data words. Since a 1533B bus is a mediated bus, these data transfers are rigorously controlled by the BC according to a pattern defined the system designers. There are also specific timing requirements on the bus in terms of the response time for an RT to the BC command message and between each data transfer. Furthermore, since the BC defines the maximum number of data words in a data transfer, the BC ultimately controls the overall timing of each major transfer.

Given the combination of the use of command and status words and the limitations of how data transfers are handled by the BC on the bus, various embodiments define a set of anomalies that would indicate a deviation from the specification that could indicate the presence of an intruder. As previously mentioned, deviations may be checked during system checkout, but they are rarely re-visited once the system becomes operational. There can be a need to check for specific deviations in the command/status words at run-time. For instance the command word issued by the BC contains four major fields—a remote terminal address, receive/transmit bit, the subaddress/mode code field, and the word count/mode code. By design, the system developer that programs the BC has complete control over who can transmit or receive data on the bus. They also define a system message catalog detailing specific message types by ID that are transferred on the bus; each entry in the catalog defines who transmits the message, who can receive it, and the maximum message length. The designer also determines what "mode codes" (specific command messages for resetting/synchronizing terminals and other maintenance functions) can be used in the system.

Given these design factors, there can be several potential run-time deviations from expected behavior:

Is the RT address valid for this particular system?
If the RT is requesting to transmit data, has it been authorized to transmit on the bus?
If the RT is receiving data, has it been authorized to receive data on the bus?
If the transfer indicates movement of data between two RTs, is this type of transfer allowed on the bus?
Does the specific data message ID exist within the system message catalog?
Is the data transfer length equal to or less than the specified length for the given message type within the system message catalog?
Does this particular system support the mode code being requested by the BC?
Does the particular system support broadcast messages for data or mode codes?

Various embodiments define a policy set for a given system that checks one or more of these conditions. Given a particular system design, the IDS can monitor all bus transactions and look for behaviors that fail these tests. Similar tests can be applied to the status messages for the system. If the RT is requested to transmit data it will issue a status word first after a specific gap time, called the response time, and then transmit the data stream. If the RT is requested to receive data it will first process all the incoming data and then send out a status word after the amount of data defined by the length value in the command word has passed. In both cases the status word defines the RT's ability to transmit or receive data. As such, the status word contains the RT address and a set of flags for indicating that status of the data transfer or the 1553B module on the RT:

ME—Message Error—indicates a parity error was detected in the message;
IN—Instrumentation—distinguishes status from command words; rarely used in newer systems;
SR—Service Request—requests the BC to service the attached RT, e.g., data transfer ready;
BR—Broadcast Command Received—indicates the RT has received a broadcast command;
BU—Busy—indicates the RT is busy and cannot respond to the BC's request;

SU—Subsystem—indicates that there has been a BIT error in the attached RT;

DB—Dynamic Bus Control—indicates the RT is ready to take control of the bus as a backup BC; and/or TE—Terminal—indicates a fault in the 1553B interface of the RT.

One or more of these flags are not used in numerous systems. For example, if Broadcast mode is not used then the BR flag is superfluous; likewise, dynamic bus control is prohibited for United States Air Force (USAF) systems as per the specification, so the DB flag is not used in USAF systems. The BU and SR flags were often used in older systems to allow the BC to poll RTs to see if they had data to send; however, many system designs do not permit this type of action and instead use other mechanisms to accomplish the same thing as polling may use a lot of bus bandwidth. An attacker can use these bits to perform some level of reconnaissance. For example, an attacker could try and determine how does the BC react when an unused flag is set. In addition, an attacker could use the unused bits to communicate surreptitiously over the bus. Various embodiments devise a policy for a 1553B IDS system that looks for the use of status flags when those specific flags are not implemented in the system.

A policy set for detecting these anomalous behaviors on a per-transaction basis may be codified into an XML (or other) schema for controlling the 1553B IDS via white listing techniques. For the 1553B IDS, a CND-specific variant of the Open Mission System (OMS) for command and control (C2) is used. In an example, a generalized XML Policy Set schema was used to define potential anomalous behaviors of the type listed above. Embodiments herein focus on white listing, e.g., identifying the types of transactions and mode codes/status flags that are permitted on the bus for a particular system and mode of operation. Distinguish between mission modes can be important, as the bus traffic patterns can be different between pre-mission, mission, and post-mission modes. In pre-mission mode one might expect multiple data load operations to download data from databases while there may be multiple log file downloads in post-mission mode. In each case, the message traffic may be different and require a different white list.

In an example using a white list methodology, the IDS checks the contents of each bus transaction and determines whether the contents of the transaction are "allowed" as per the policy. For data transfers, this check implies that the RT addresses, direction of transfer (who transmits and who receives), the message ID, and the message length all meet the policy. For command transfers, e.g., mode codes, the IDS checks to see if the mode code is in the list of codes used by the system. In both cases the IDS checks for use of broadcast mode and validates the use of specific status flags. If the IDS determines that one or more of these data points are not permitted by policy the IDS can issue an alert.

An example schema may accommodate different types of buses such as ARINC-429 and CAN bus. The policy set contains one or more specific policy types. Each policy type is given a unique identifier using a 128 bit, or other length, UUID (Universally Unique Identifier) and/or a flag identifying whether the policy is active and a descriptor for the type of alert mode to be used. The enable flag allows individual policies to be enabled or disabled as needed during a mission. Each entry in the policy set may describe a specific type of behavior to be monitored. The following are example behaviors that may be monitored:

RT Addresses (1553BRTRegisteredAddressType)—This may include a list of the active RT addresses on the bus along with an indicator of whether the specific RT can only transmit data, receive data, or do both. If the system detects a message transfer with an RT address not on this list, or if the direction of transfer is not supported, it will declare an anomaly;

RT to RT Transfers (RTtoRTDataTransferAllowedFlag)—This is a flag indicating whether the particular bus supports direct RT to RT transfers. Some instantiations do not support this mode, so if this flag is not set and an RT to RT transfer is encountered CADS will declare an anomaly;

Status Word Flags (1553BValidStatusFlagSetType)—This is a set of flags indicating whether a specific status word flag bit is used within the data transfers supported on the bus. If set, the flag is allowed; otherwise, use of the flag in a data transfer is an anomaly. For instance, USAF systems do not allow use of Dynamic Bus Control;

Valid Mode Codes (1553BValidModeCodeType)—This is a set of entries defining which mode codes are supported on the bus as well as defining whether broadcast mode is supported and whether an attached data word can be transmitted in the case where that option exists. It is not unusual for a particular bus instantiation to limit the number of usable mode codes to a much smaller number (3 to 4) then the set defined in the specification. If the BC transmits a mode code that is not on this list then an anomaly has occurred;

Data Transfer Subaddress Restrictions (1553BDataSubaddressRestrictionType)—This enables the user to define the specific message catalog for the system for every allowable bus data transaction. It defines the specific RT addresses for sender and receiver, the corresponding subaddress value, and the expected message length. Any transfer occurring on the bus that is not included on this list can be considered anomalous. In terms of message length most buses require that the number of words transferred by less than or equal to the message length, so a data word count that exceeds the message length indicates an anomaly;

pattern descriptor—This enables detection of a pattern of behavior of an RT; and/or Spatial Voting (SV) matrix, which uses spatial voting to determine if there is an anomaly.

The policy may define an alerting threshold for one or more of the policy types. These thresholds define how many "events", e.g., failures to comply with policy, should occur before an alert is generated. In an example, there are four types of alerts:

LIMIT ALERT—Alert on every event that occurs up to the first K alerts, where K is the threshold value included with the alert description; suppress any additional alerts occurring after the Kth alert;

THRESHOLD ALERT—Alert on every Kth event that occurs, where K is the threshold value included with the alert description;

ONE SHOT—Alert on the Kth event that occurs, where K is the threshold value included with the alert description; after the first alert occurs suppress any additional alerts; and ALWAYS—Alert every time the event occurs.

Figure 25:
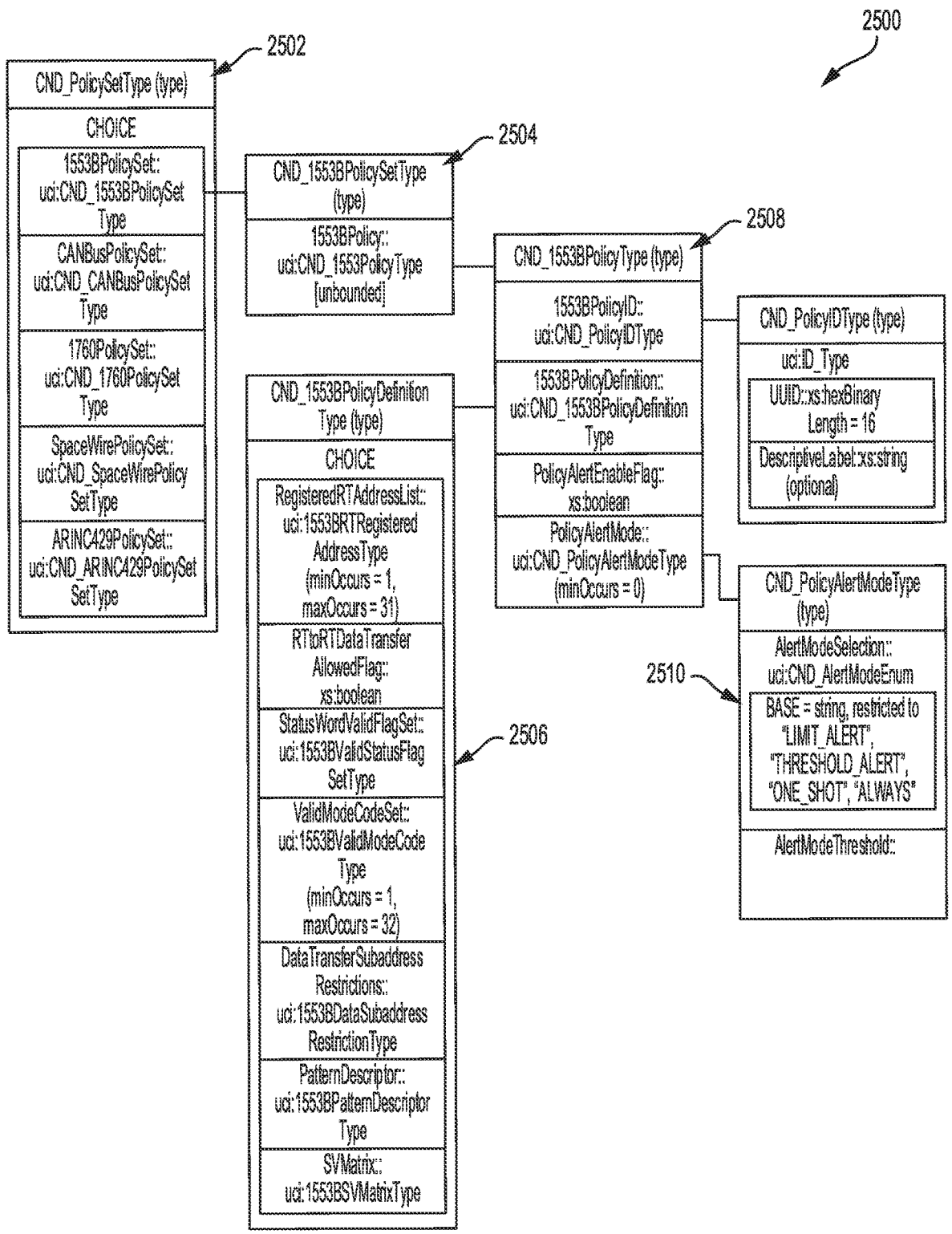
FIG. 25 illustrates, by way of example, an embodiment of respective portions of a policy set schema.

FIG. 25 illustrates, by way of example, an embodiment of respective portions of a policy set schema 2500. In the portion of the schema to create policies 2500 a policy type is set, "CND_PolicySetType (type)" 2502 and/or "CND_1553BPolicySetType (type)" 2504. As a Policy Set is bound to a specific activity subcapability, or interface the policies are stored in the Policy Set. A policy definition is provided in "CND_1553BPolicyDefinitionType (type)" 2506. In an example, the policy definition defines the various policies that are allowed. As another example, the policy definition uses a black list methodology where the policy definition defines the disallowed policies. A CND_1553BPolicyType object 2508 stores the policy definition. In addition, the policy type object 2508 points to or contains an alert mode object 2510 that defines how detected anomalies should be handled. A Policy ID Type object 2512 includes a UUID for the policy as well as a descriptive label.

Figure 26:
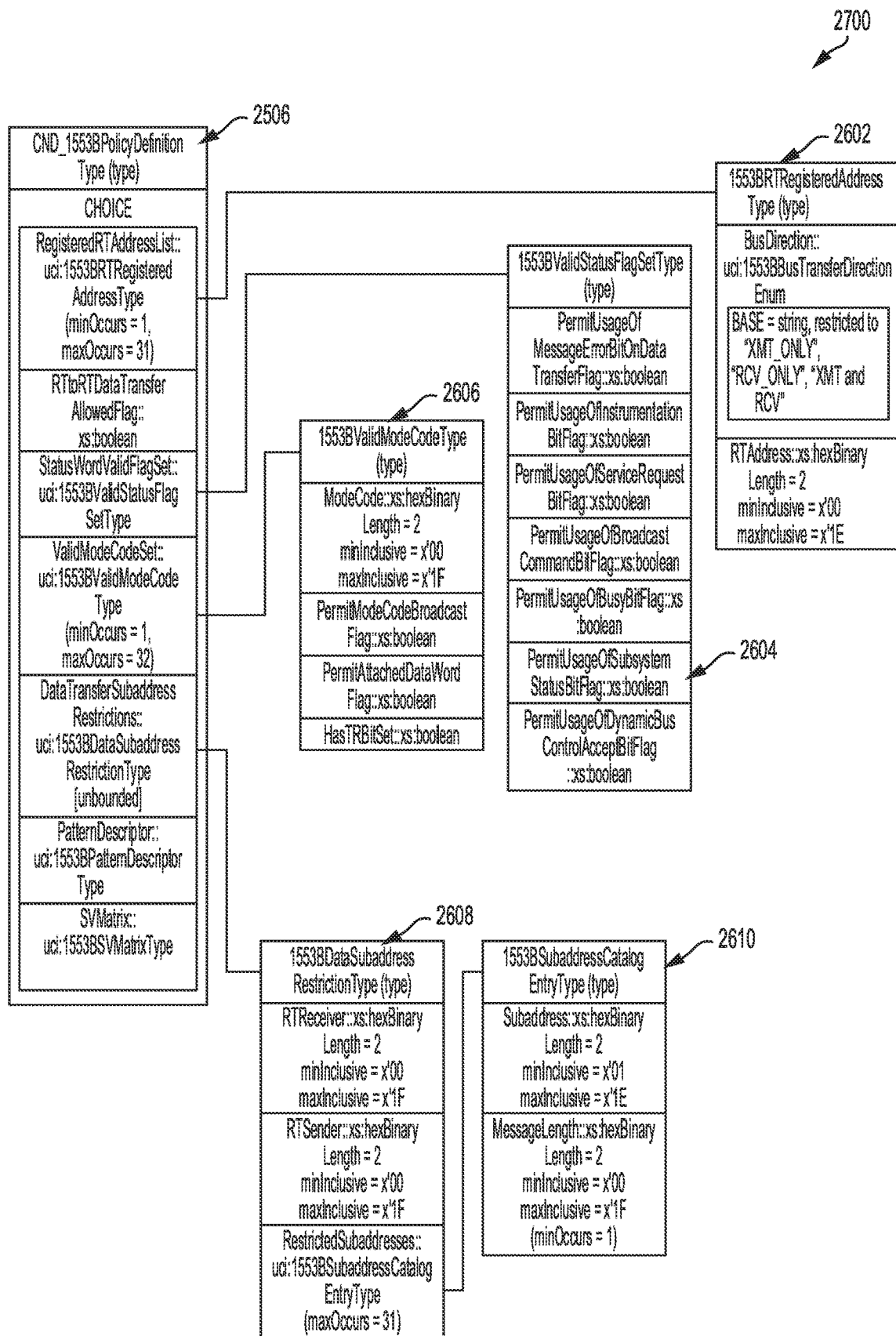
FIG. 26 illustrates, by way of example, an embodiment of respective portions of a policy definition schema.

FIG. 26 illustrates, by way of example, an embodiment of respective portions of a policy definition schema 2600. In the portion of the schema to create policies 2600, valid RT addresses can be defined, "1553BRTRegisteredAddressType (type)" 2602. This object 2602 supports a list of valid RT addresses for a bus and the specific data transfer directions supported. A valid flag types is defined as "1553BValidStatusFlagSetType (type)" 2604. This object 2604 defines which status bits may be used on the bus. Valid modes can be defined by "1553BValidModeCodeType (type)" 2606. This object 2606 defines elements of an array that contain the valid mode codes for a policy. This list may only include the mode codes that the policy supports and any restrictions applied to the codes. Restricted sub-addresses can be defined as "1553BDataSubaddressRestrictionType (type) 2608. The subaddress restrictions may be defined as a set of definable data transfers an RT can receive from another RO or BC in the system. For example, an RT address=X'1F(21) indicates the sender or receive is the BC. The sender and receiver values should not be the same. According the object 2608 defines a list of subaddresses that may be transferred between two distinct endpoints on the bus. A subaddress entry type can be defined as "1553BSubaddressCatalogEntryType (type)" 2610. The object 2610 defines the entries in the subaddress catalog list for data transfers between a sender and a receiver. The length value may be optional.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 27:
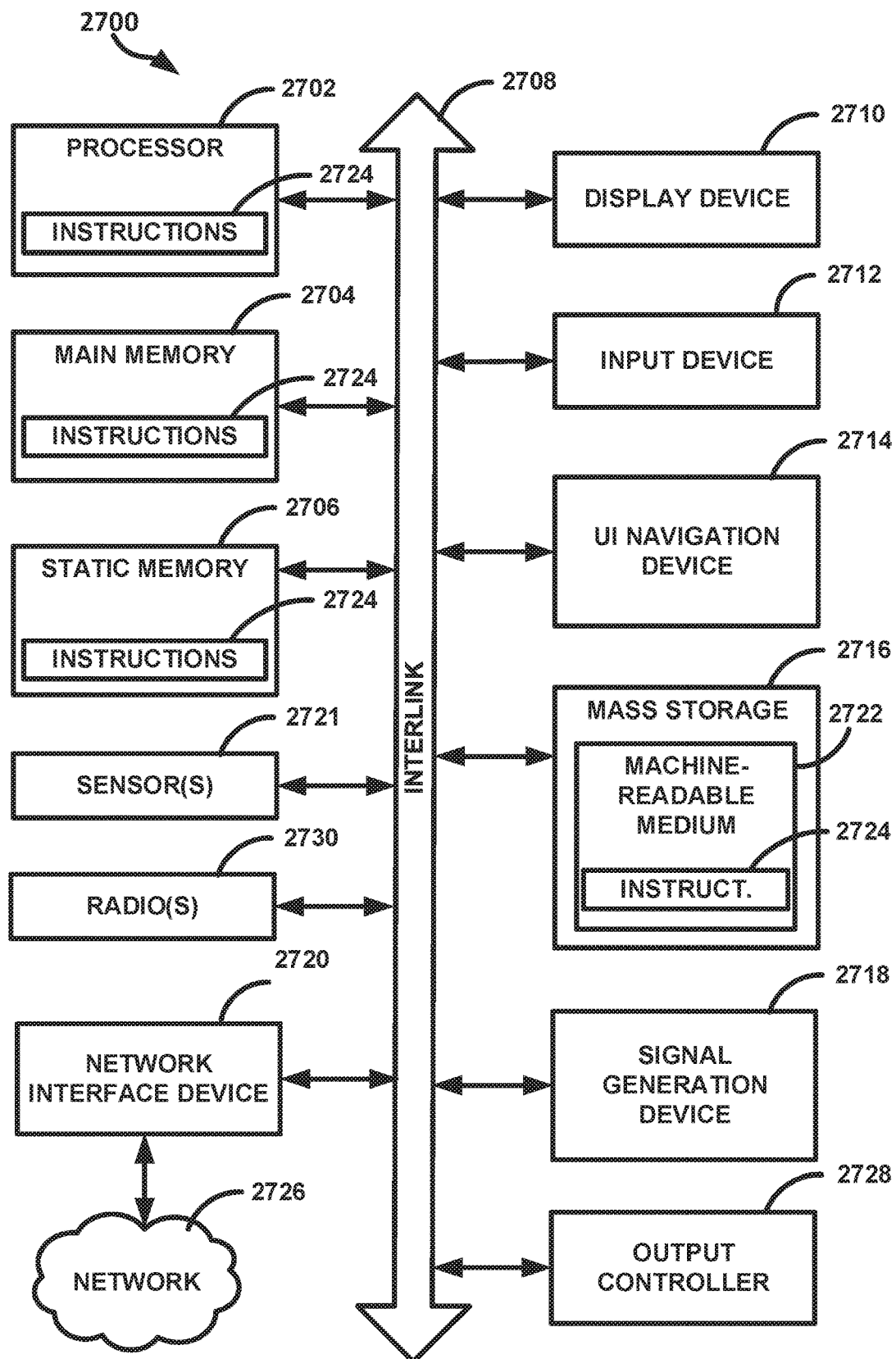
FIG. 27 illustrates, by way of example, a block diagram of an embodiment of a machine on which one or more of the methods, such as those discussed herein, can be implemented.

FIG. 27 illustrates, by way of example, a block diagram of an embodiment of a machine in the example form of a computer system 300 within which instructions, for causing the machine to perform any one or more of the methodologies discussed herein, may be executed. In one or more embodiments, one or more items of the computer network defense system, the MEM 1202, or the TTM 1204 can be implemented by the machine 2700. In alternative embodiments, the machine 2700 operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2700 includes a processor 2702 (e.g., a central processing unit (CPU), a graphics processing unit (GPU) or both), a main memory 2704 and a static memory 2706, which communicate with each other via a bus 2708. The computer system 2700 may further include a video display unit 2710 (e.g., a liquid crystal display (LCD) or a cathode ray tube (CRT)). The computer system 2700 also includes an alphanumeric input device 2712 (e.g., a keyboard), a user interface (UI) navigation device 2714 (e.g., a mouse), a mass storage unit 2716, a signal generation device 2718 (e.g., a speaker), a network interface device 2720, and radios 2730 such as Bluetooth, WWAN, WLAN, and NFC, permitting the application of security controls on such protocols.

The mass storage unit 2716 includes a machine-readable medium 2722 on which is stored one or more sets of instructions and data structures (e.g., software) 2724 embodying or utilized by any one or more of the methodologies or functions described herein. The instructions 2724 may also reside, completely or at least partially, within the main memory 2704 and/or within the processor 2702 during execution thereof by the computer system 2700, the main memory 2704 and the processor 2702 also constituting machine-readable media.

While the machine-readable medium 2722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 2724 may further be transmitted or received over a communications network 2726 using a transmission medium. The instructions 2724 may be transmitted using the network interface device 2720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

EXAMPLES AND ADDITIONAL NOTES

Example 1 is a non-transitory machine-readable medium including instructions that, when executed by processing circuitry of a machine, configure the processing circuitry for detection of policy anomalies in packets on a 1553B bus of an airborne system, the processing circuitry configured to perform operations comprising: decoding a computer network defense (CND) capability message, wherein the CND capability message indicates an interface to monitor, and wherein the interface is the 1553B bus of the airborne system; decoding a CND command message, associated with the CND capability message, the CND command message comprising a policy set; receiving packets from the 1553B bus; analyzing the 1553B packets based on the policy set to determine anomalies; allowing non-anomalous 1553B packets to reach destinations of the non-anomalous 1553B packets; and discarding anomalous 1553B packets such that the anomalous 1553B packets do not reach respective destinations of the anomalous 1533B packets.

In Example 2, the subject matter of Example 1 includes, B packets based on the policy set to determine anomalies comprises: analyzing a mode code of a data transfer to determine if the mode code is allowed based on the policy set; analyzing a status flag of the data transfer to determine if the status flag is allowed based on the policy set; analyzing a source of the data transfer to determine if the source is allowed based on the policy set; and analyzing a destination of the data transfer to determine if the destination is allowed based on the policy set.

In Example 3, the subject matter of Example 2 includes, B packets based on the policy set to determine anomalies is based on the mission mode.

In Example 4, the subject matter of Examples 2-3 includes, B packets based on the policy set to determine anomalies comprises determining the source of the data transfer is allowed to send data to the destination of the data transfer based on the policy set.

In Example 5, the subject matter of Example 4 includes, B packets based on the policy set to determine anomalies comprises: determining the data transfer is a first remote terminal to a second remote terminal transfer; and determining the first remote terminal to the second remote terminal transfer is allowed based on the policy set.

In Example 6, the subject matter of Examples 2-5 includes, B bus based on a transmit flag associated with the source.

In Example 7, the subject matter of Examples 2-6 includes, wherein the operations further comprise: determining a predetermined number of anomalies have occurred on the 1553B bus; and encoding an alert based on determining the predetermined number of anomalies have occurred on the 1553B bus.

Example 8 is a method for detection of policy anomalies in packets on a 1553B bus of an airborne system, the method comprising: decoding a computer network defense (CND) capability message, wherein the CND capability message indicates an interface to monitor, and wherein the interface is the 1553B bus of the airborne system; decoding a CND command message, associated with the CND capability message, the CND command message comprising a policy set; receiving packets from the 1553B bus; analyzing the 1553B packets based on the policy set to determine anomalies; allowing non-anomalous 1553B packets to reach destinations of the non-anomalous 1553B packets; and discarding anomalous 1553B packets such that the anomalous 1553B packets do not reach respective destinations of the anomalous 1533B packets.

In Example 9, the subject matter of Example 8 includes, B packets based on the policy set to determine anomalies comprises: analyzing a mode code of a data transfer to determine if the mode code is allowed based on the policy set; analyzing a status flag of the data transfer to determine if the status flag is allowed based on the policy set; analyzing a source of the data transfer to determine if the source is allowed based on the policy set; and analyzing a destination of the data transfer to determine if the destination is allowed based on the policy set.

In Example 10, the subject matter of Example 9 includes, B packets based on the policy set to determine anomalies is based on the mission mode.

In Example 11, the subject matter of Examples 9-10 includes, B packets based on the policy set to determine anomalies comprises determining the source of the data transfer is allowed to send data to the destination of the data transfer based on the policy set.

In Example 12, the subject matter of Example 11 includes, B packets based on the policy set to determine anomalies comprises: determining the data transfer is a first remote terminal to a second remote terminal transfer; and determining the first remote terminal to the second remote terminal transfer is allowed based on the policy set.

In Example 13, the subject matter of Examples 9-12 includes, B bus based on a transmit flag associated with the source.

In Example 14, the subject matter of Examples 9-13 includes, determining a predetermined number of anomalies have occurred on the 1553B bus; and encoding an alert based on determining the predetermined number of anomalies have occurred on the 1553B bus.

Example 15 is a system for detection of policy anomalies in packets on a 1553B bus of an airborne system, the system comprising: processing circuitry; a memory including program instructions that, when executed the processing circuitry, configure the processing circuitry to: decode a computer network defense (CND) capability message, wherein the CND capability message indicates an interface to monitor, and wherein the interface is the 1553B bus of the airborne system; decode a CND command message, associated with the CND capability message, the CND command message comprising a policy set; receive packets from the 1553B bus; analyze the 1553B packets based on the policy set to determine anomalies; allow non-anomalous 1553B packets to reach destinations of the non-anomalous 1553B packets; and discard anomalous 1553B packets such that the anomalous 1553B packets do not reach respective destinations of the anomalous 1533B packets.

In Example 16, the subject matter of Example 15 includes, B packets based on the policy set to determine anomalies the processing circuitry is configured to: analyze a mode code of a data transfer to determine if the mode code is allowed based on the policy set; analyze a status flag of the data transfer to determine if the status flag is allowed based on the policy set; analyze a source of the data transfer to determine if the source is allowed based on the policy set; and analyze a destination of the data transfer to determine if the destination is allowed based on the policy set.

In Example 17, the subject matter of Example 16 includes, B packets based on the policy set to determine anomalies is based on the mission mode.

In Example 18, the subject matter of Examples 16-17 includes, B packets based on the policy set to determine anomalies the processing circuitry is configured to determine the source of the data transfer is allowed to send data to the destination of the data transfer based on the policy set.

In Example 19, the subject matter of Example 18 includes, B packets based on the policy set to determine anomalies the processing circuitry is configured to: determine the data transfer is a first remote terminal to a second remote terminal transfer; and determine the first remote terminal to the second remote terminal transfer is allowed based on the policy set.

In Example 20, the subject matter of Examples 16-19 includes, B bus, and wherein to analyze a source of the data transfer to determine if the source is allowed based on the policy set the processing circuitry is configured to: determine the list of active 1553B bus addresses comprises the source; and determine the source is allowed to send data on the 1533B bus based on a transmit flag associated with the source.

In Example 21, the subject matter of Examples 16-20 includes, wherein the processing circuitry is configured to: determine a predetermined number of anomalies have occurred on the 1553B bus; and encode an alert based on determination that the predetermined number of anomalies have occurred on the 1553B bus.

Example 22 is at least one machine-readable medium including instructions that, when executed by processing circuitry, cause the processing circuitry to perform operations to implement of any of Examples 1-21.

Example 23 is an apparatus comprising means to implement of any of Examples 1-21.

Example 24 is a system to implement of any of Examples 1-21.

Example 25 is a method to implement of any of Examples 1-21.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A non-transitory machine-readable medium including instructions that, when executed by processing circuitry of a machine, configure the processing circuitry for detection of policy anomalies in packets on a 1553B bus of an airborne system, the processing circuitry configured to perform operations comprising:
   decoding a computer network defense (CND) capability message, wherein the CND capability message indicates an interface to monitor, and wherein the interface is the 1553B bus of the airborne system;
   decoding a CND command message, associated with the CND capability message, the CND command message comprising a policy set;
   receiving packets from the 1553B bus;
   analyzing the 1553B packets based on the policy set to determine anomalies;
   allowing non-anomalous 1553B packets to reach destinations of the non-anomalous 1553B packets; and
   discarding anomalous 1553B packets such that the anomalous 1553B packets do not reach respective destinations of the anomalous 1533B packets; and
   wherein analyzing the 1553B packets based on the policy set to determine anomalies comprises:
   analyzing a mode code of a data transfer to determine if the m ode code is allowed based on the policy set;
   analyzing a status flag of the data transfer to determine if the status flag is allowed based on the policy set;
   analyzing a source of the data transfer to determine if the source is allowed based on the policy set; and
   analyzing a destination of the data transfer to determine if the destination is allowed based on the policy set.

2. The non-transitory machine-readable medium of claim 1, wherein the operations further comprise decoding a mission mode, wherein analyzing the 1553B packets based on the policy set to determine anomalies is based on the mission mode.

3. The non-transitory machine-readable medium of claim 1, wherein analyzing the 1553B packets based on the policy set to determine anomalies comprises determining the source of the data transfer is allowed to send data to the destination of the data transfer based on the policy set.

4. The non-transitory machine-readable medium of claim 3, wherein analyzing the 1553B packets based on the policy set to determine anomalies comprises:
   determining the data transfer is a first remote terminal to a second remote terminal transfer; and
   determining the first remote terminal to the second remote terminal transfer is allowed based on the policy set.

5. The non-transitory machine-readable medium of claim 1, wherein the policy set comprises a list of active 1553B bus addresses, wherein each list of active 1553B bus addresses is associated with a transmit flag that indicates if the each list of active 1553B bus addresses is allowed to transmit data on the 1553B bus, and wherein analyzing a source of the data transfer to determine if the source is allowed based on the policy set comprises determining the list of active 1553B bus addresses comprises the source, and determining the source is allowed to send data on the 1533B bus based on a transmit flag associated with the source.

6. The non-transitory machine-readable medium of claim 1, wherein the operations further comprise:
   determining a predetermined number of anomalies have occurred on the 1553B bus; and
   encoding an alert based on determining the predetermined number of anomalies have occurred on the 1553B bus.

7. A method for detection of policy anomalies in packets on a 1553B bus of an airborne system, the method comprising:
   decoding a computer network defense (CND) capability message, wherein the CND capability message indicates an interface to monitor, and wherein the interface is the 1553B bus of the airborne system;
   decoding a CND command message, associated with the CND capability message, the CND command message comprising a policy set;
   receiving packets from the 1553B bus;
   analyzing the 1553B packets based on the policy set to determine anomalies;
   allowing non-anomalous 1553B packets to reach destinations of the non-anomalous 1553B packets; and discarding anomalous 1553B packets such that the anomalous 1553B packets do not reach respective destinations of the anomalous 1533B packets; and wherein analyzing the 1553B packets based on the policy set to determine anomalies comprises:

analyzing a mode code of a data transfer to determine if the mode code is allowed based on the policy set;

analyzing a status flag of the data transfer to determine if the status flag is allowed based on the policy set;

analyzing a source of the data transfer to determine if the source is allowed based on the policy set; and analyzing a destination of the data transfer to determine if the destination is allowed based on the policy set.

8. The method of claim 7, further comprising decoding a mission mode, wherein analyzing the 1553B packets based on the policy set to determine anomalies is based on the mission mode.

9. The method of claim 7, wherein analyzing the 1553B packets based on the policy set to determine anomalies comprises determining the source of the data transfer is allowed to send data to the destination of the data transfer based on the policy set.

10. The method of claim 9, wherein analyzing the 1553B packets based on the policy set to determine anomalies comprises:

determining the data transfer is a first remote terminal to a second remote terminal transfer; and determining the first remote terminal to the second remote terminal transfer is allowed based on the policy set.

11. The method of claim 7, wherein the policy set comprises a list of active 1553B bus addresses, wherein each list of active 1553B bus addresses is associated with a transmit flag that indicates if the each list of active 1553B bus addresses is allowed to transmit data on the 1553B bus, and wherein analyzing a source of the data transfer to determine if the source is allowed based on the policy set comprises determining the list of active 1553B bus addresses comprises the source, and determining the source is allowed to send data on the 1533B bus based on a transmit flag associated with the source.

12. The method of claim 7, further comprising:

determining a predetermined number of anomalies have occurred on the 1553B bus; and encoding an alert based on determining the predetermined number of anomalies have occurred on the 1553B bus.

13. A system for detection of policy anomalies in packets on a 1553B bus of an airborne system, the system comprising:

processing circuitry;

a memory including program instructions that, when executed the processing circuitry, configure the processing circuitry to:

decode a computer network defense (CND) capability message, wherein the CND capability message indicates an interface to monitor, and wherein the interface is the 1553B bus of the airborne system;

decode a CND command message, associated with the CND capability message, the CND command message comprising a policy set;

receive packets from the 1553B bus;

analyze the 1553B packets based on the policy set to determine anomalies;

allow non-anomalous 1553B packets to reach destinations of the non-anomalous 1553B packets; and discard anomalous 1553B packets such that the anomalous 1553B packets do not reach respective destinations of the anomalous 1533B packets; and where to analyze the 1553B packets based on the policy set to determine anomalies the processing circuitry is configured to:

analyze a mode code of a data transfer to determine if the mode code is allowed based on the policy set;

analyze a status flag of the data transfer to determine if the status flag is allowed based on the policy set;

analyze a source of the data transfer to determine if the source is allowed based on the policy set; and analyze a destination of the data transfer to determine if the destination is allowed based on the policy set.

14. The system of claim 13, wherein the processing circuitry is configured to decode a mission mode, wherein the analysis of the 1553B packets based on the policy set to determine anomalies is based on the mission mode.

15. The system of claim 13, wherein to analyze the 1553B packets based on the policy set to determine anomalies the processing circuitry is configured to determine the source of the data transfer is allowed to send data to the destination of the data transfer based on the policy set.

16. The system of claim 15, wherein to analyze the 1553B packets based on the policy set to determine anomalies the processing circuitry is configured to:

determine the data transfer is a first remote terminal to a second remote terminal transfer; and determine the first remote terminal to the second remote terminal transfer is allowed based on the policy set.

17. The system of claim 13, wherein the policy set comprises a list of active 1553B bus addresses, wherein each list of active 1553B bus addresses is associated with a transmit flag that indicates if the each list of active 1553B bus addresses is allowed to transmit data on the 1553B bus, and wherein to analyze a source of the data transfer to determine if the source is allowed based on the policy set the processing circuitry is configured to:

determine the list of active 1553B bus addresses comprises the source; and determine the source is allowed to send data on the 1533B bus based on a transmit flag associated with the source.

* * * * *